United States Patent [19]

Swanstrom et al.

[11] 4,130,882
[45] Dec. 19, 1978

[54] LANGUAGE TRANSLATING APPARATUS AND METHODS THEREFOR

[75] Inventors: H. Wallace Swanstrom; Kenneth C. Campbell, both of Dallas, Tex.; Robin F. G. Linford, Welwyn Garden City, England

[73] Assignee: Xerox Corporation, Stamford, Conn.

[21] Appl. No.: 702,784

[22] Filed: Jul. 6, 1976

[30] Foreign Application Priority Data

Jul. 29, 1975 [GB] United Kingdom ............ 31701/75

[51] Int. Cl.² ............................................ G06F 15/00
[52] U.S. Cl. ............................................... 364/900
[58] Field of Search ............ 444/1; 364/900 MS File, 364/200, 200 MS File

[56] References Cited

U.S. PATENT DOCUMENTS

| | | | |
|---|---|---|---|
| 3,582,904 | 6/1971 | Bradwein | 364/200 |
| 3,737,861 | 6/1973 | O'Neill et al. | 364/200 |
| 3,739,344 | 6/1973 | Serracchioli et al. | 364/200 |
| 3,921,148 | 11/1975 | Ophir et al. | 364/200 |
| 3,936,807 | 3/1976 | Edwards | 364/200 |
| 3,979,730 | 9/1976 | Bennett et al. | 364/200 |

*Primary Examiner*—Gareth D. Shaw
*Assistant Examiner*—Michael C. Sachs

[57] ABSTRACT

This invention is directed to language translating apparatus and methods therefor which act, under program control, to enable automatic writing systems of the type disclosed herein, to be simply and easily adapted to operate with keyboard input peripherals which are standard outside the United States. The language translator apparatus herein permits the automatic writing system to be modified to accept the standard keyboard and print wheel arrangement employed in a plurality of countries merely by its inclusion as a peripheral and adapting the keys on the keyboard for a given country. When data is entered into the system at the keyboard, the language translator peripheral, which includes a plurality of translator ROM's, is active to translate the resulting input codes into recordable system codes to which the automatic writing system as a whole may respond.

5 Claims, 38 Drawing Figures

SPANISH

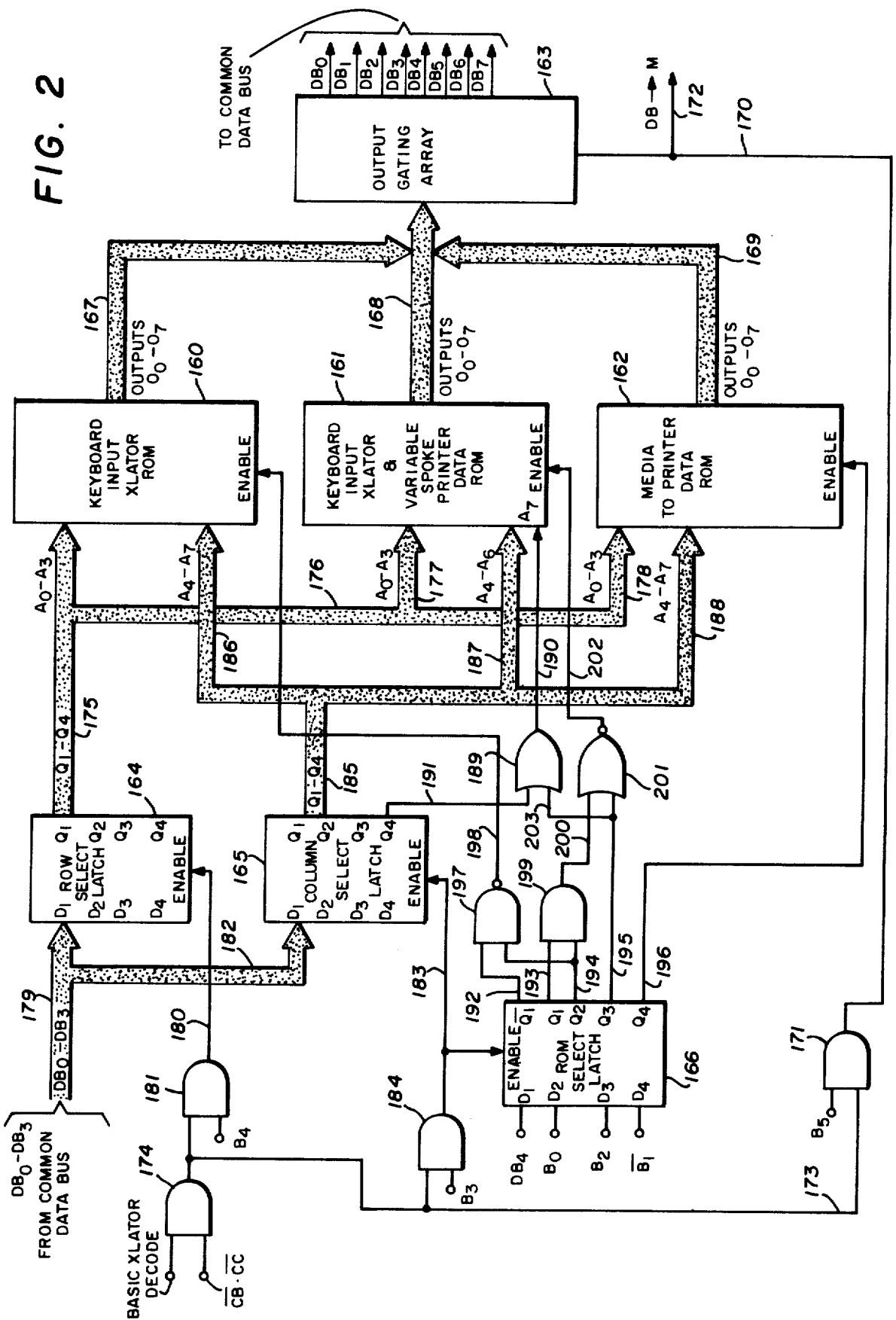

FIG. 3E — BELGIAN

FIG. 3F — ITALIAN

FIG. 3G — SWISS-FRENCH

FIG. 3H — SWISS-GERMAN

FIG. 3I  SWEDISH

FIG. 3J  DUTCH

FIG. 3K  SPANISH

FIG. 3L  FRENCH CANADIAN

FIG. 5

MEDIA-COMPATIBLE PRINTING CHARACTER CODES

NOTE: THE PERIOD CODE IN THESE LANGUAGE MARKET VERSIONS IS INITIATED FROM A "SHIFTED" KEY DEPRESSION.

US: US ENGLISH  GE: GERMAN  BE: BELGIAN  SF: SWISS FRENCH  SW: SWEDISH  SP: SPANISH
UK: UK ENGLISH  FR: FRENCH  IT: ITALIAN  SG: SWISS GERMAN  NE: NETHERLANDS  CA: CANADIAN FRENCH

NON-COMMON KEYS & CHARACTERS

| KEY (ISO) | CODE | USO | UK | GE | FR | BE | IT | SF | SG | SW | NE | SP | XCC |
|---|---|---|---|---|---|---|---|---|---|---|---|---|---|
| (0) | 60 | × | + | £ | £ | § | & | £ | 3/4 | 1/4 | 3/4 | $ | + |
| (0) | 5E | × | = | $ | $ | ! | $ | $ | 1/4 | 3/4 | ç | 1/2 | = |
| 1 | 21 | ! | * | ; | 1 | 1 | 1 | + | ; | $ | ! | £ | · |
| 1 | 31 | 1 | 1 | 1 | & | & | £ | 1 | 1 | 1 | 1 | 1 | 1 |
| 4 | 40 | @ | " | " | 2 | 2 | 2 | " | " | 1/2 | " | " | " |
| 4 | 32 | 2 | 2 | 2 | é | é | é | 2 | 2 | 2 | 2 | 2 | 2 |
| 8 | 23 | # | / | = | 3 | 3 | 3 | ç | * | & | = | % | / |
| 8 | 33 | 3 | 3 | 3 | " | " | " | 3 | 3 | 3 | 3 | 3 | 3 |
| 12 | 24 | $ | @ | % | 4 | 4 | 4 | % | % | % | % | & | $ |
| 12 | 34 | 4 | 4 | 4 | ' | ' | ' | 4 | 4 | 4 | 4 | 4 | 4 |
| 16 | 25 | % | £ | & | 5 | 5 | 5 | & | & | ( | & | ) | % |
| 16 | 35 | 5 | 5 | 5 | ( | ( | ( | 5 | 5 | 5 | 5 | 5 | 5 |
| 20 | 5D | ¢ | — | ( | 6 | 6 | 6 | ( | ( | — | ( | ) | ? |
| 20 | 36 | 6 | 6 | 6 | - | - | - | 6 | 6 | 6 | 6 | 6 | 6 |
| 24 | 26 | & | & | ) | 7 | 7 | 7 | ) | ) | — | ) | — | & |
| 24 | 37 | 7 | 7 | 7 | `e | `e | `e | 7 | 7 | 7 | 7 | 7 | 7 |
| 28 | 2A | * | ' | — | 8 | 8 | 8 | — | — | ) | — | = | * |
| 28 | 38 | 8 | 8 | 8 | — | — | — | 8 | 8 | 8 | 8 | 8 | 8 |
| 32 | 28 | ( | ( | § | 9 | 9 | 9 | * | ' | / | + | ! | ( |
| 32 | 39 | 9 | 9 | 9 | ç | ç | ç | 9 | 9 | 9 | 9 | 9 | 9 |
| 36 | 29 | ) | ) | / | ø | ø | ø | / | / | § | / | ' | ) |
| 36 | 30 | ø | ø | ø | `a | `a | `a | ø | ø | ø | ø | ø | ø |
| 40 | 5F | — | ? | : | ° | ° | ° | ‥ | ^ | ' | ` | — | — |
| 40 | 2D | - | - | ß | ) | ) | ) | ^ | ` | " | / | ç | - |
| 44 | 2B | + | 1/4 | ` | § | + | ‥ | 1/2 | ç | ` | ^ | º | @ |
| 44 | 3D | = | 3/4 | ' | ! | = | ^ | é | é | / | ‥ | ª | ¢ |

NON-COMMON KEYS & CHARACTERS

| KEY (ISO) | CODE | USO | UK | GE | FR | BE | IT | SF | SG | SW | NE | SP | XCC |
|---|---|---|---|---|---|---|---|---|---|---|---|---|---|
| 2 | 51 | Q | Q | Q | A | A | Q | Q | Q | Q | Q | Q | Q |
| 2 | 71 | q | q | q | a | a | q | q | q | q | q | q | q |
| 6 | 57 | W | W | W | Z | Z | Z | W | W | W | W | W | W |
| 6 | 77 | w | w | w | z | z | z | w | w | w | w | w | w |
| 22 | 59 | Y | Y | Z | Y | Y | Y | Z | Z | Y | Y | Y | Y |
| 22 | 79 | y | y | z | y | y | y | z | z | y | y | y | y |
| 42 | 5B | 1/4 | # | ü | ·· | ·· | = | ù | § | + | 1/4 | ` | ç |
| 42 | 5C | 1/2 | ! | ü | ^ | ^ | `i | `e | ü | = | 1/2 | / | ç |
| 45 | 7B | × | 1/3 | * | œ | Fr | + | 3/4 | £ | £ | £ | ¿ | ûc |
| 45 | 7C | × | 2/3 | + | 1/2 | 1/2 | 1/2 | 1/4 | $ | ü | $ | i | ^ |

FIG. 6C

NON-COMMON KEYS & CHARACTERS

| KEY (ISO) | CODE | USO | UK | GE | FR | BE | IT | SF | SG | SW | NE | SP | XCC |
|---|---|---|---|---|---|---|---|---|---|---|---|---|---|
| 3 | 41 | A | A | A | Q | Q | A | A | A | A | A | A | A |
| 3 | 61 | a | a | a | q | q | a | a | a | a | a | a | a |
| 39 | 3A | : | : | ö | M | M | M | § | + | : | f | Ñ | : |
| 39 | 3B | ; | ; | ö | m | m | m | ' | ö | , | jj | ñ | ; |
| 43 | 22 | " | ¢ | Ä | % | % | % | : | : | ? | : | ·· | ûc |
| 43 | 27 | ' | $ | ö | ù | ù | ù | ò | à | ' | ; | ^ | ` |

FIG. 6D

NON-COMMON KEYS & CHARACTERS

| KEY (ISO) | CODE | USO | UK | GE | FR | BE | IT | SF | SG | SW | NE | SP | XCC |
|---|---|---|---|---|---|---|---|---|---|---|---|---|---|
| 5 | 5A | Z | Z | Y | W | W | W | Y | Y | Z | Z | Z | Z |
| 5 | 7A | z | z | y | w | w | w | y | y | z | z | z | z |
| 29 | 4D | M | M | M | ? | ? | ? | M | M | M | M | M | M |
| 29 | 6D | m | m | m | , | , | , | m | m | m | m | m | m |
| 33 | 3C | , | , | ? | . | . | . | ? | ? | Å | ? | ? | ' |
| 33 | 2C | , | , | , | ; | ; | ; | , | , | å | , | , | , |
| 37 | 3E | . | . | ! | / | / | / | ; | 1/2 | Ä | . | / | . |
| 37 | 2E | . | . | . | : | : | : | . | . | ä | . | . | . |
| 41 | 3F | ? | % | ' | + | 3/4 | ! | = | = | Ö | ' | : | É |
| 41 | 2F | / | 1/2 | - | = | 1/4 | b | - | - | ö | - | ; | é |

FIG. 8A

CODE: NATIVE KB CONVERSION/VARIABLE SPOKE
PRINTER DATA 3.6-1

NOTE: ACCENTS HAVE APPARENT UV=5

NOTE: PRINTER DATA RON Ø REFLECTS THE ORIGINAL UV ASSIGNMENTS (NO "INTERIM FIX" INCREASED UV'S)

FIG. 8B

CODE KB → MEDIA UK ENGLISH ØII     3.6-2.6

| BITS HIGH ORDER / LOW ORDER HEX | | 0 | 1 £ | 2 $ | 3 * | 4 + | 5 ; | 6 ,UC | 7 .UC | 8 o | 9 1/4 | A 1/2 | B 4 | C 1/3 | D 2/3 | E # | F 3/4 |
|---|---|---|---|---|---|---|---|---|---|---|---|---|---|---|---|---|---|
| | HEX | 0 | 1 | 2 | 3 | 4 | 5 | 6 | 7 | 8 | 9 | A | B | C | D | E | F |
| 0 | UX | | | | | | | | | | | | | | | | |
| 1 | UK | 21 | 23 | 24 | 2A | 2B | 3B | 3C 60 | 3E 5D ü | 40 | 5B | 5C | 5D | 7B | 7C | 7D | 7E |
| 2 | GW2 | 21 | 23 | 24 ä | 2A ° 5B | 2B | 3B | 3C 5E | 3C | 5E /40 | 5C ö | 7D ü | 40 § | Ä 5B | ä 7B | 7E β | 7C ö |
| 3 | FR3 | 21 | Fr 24 | § 2A | 5D ° | 2B | 3B | 5E | 3C | 60 à | 5D § | 7E | 5C § | 7D è | 7B è | 7C ù | 60 à |
| 4 | BW4 | 21 | 23 | 24 | 5D | 2B | 3B | 5E | 3C | 60 à | 5B | 7C | 5C § | 7D è | 7B è | 60 ù | 7E |
| 5 | IT5 | 21 | 23 | 24 | 2A | 2B | 3B | 5E | 3C | 40 à | 5D | 7E | 40 § | 7D è | 7B è | 7C ù | 5B ì |
| 6 | SG6 | 96 0 | 23 | 24 | 2A | 2B | 3B | 5E | 60 | 40 § | 3C | 5D | 5C § | 7B Ä | 7B ö | 7C ü | 7E |
| 7 | SG7 | ö 7C | 23 | 24 | 2A | 2B | 3B | 5E Å | 60 | 2A § | 3C | 3B | 5C § | 5B Å | 7B ö | 5C ö | 5E |
| 8 | SW8 | ö 7C | 23 | § 2A ü | 7E | 2B | 7D § | 5D Å | 60 | | | | | | | | |
| 9 | NE9 | 21 | 23 | 24 | 2A | 2B | 3B | 5E | 3E | 40 | 5B | 5D | 5C § | 7D f | 7C ij | 3C | 7B |
| A | SP10 | 21 | 23 | 24 | 2A | 2B | 3B | 5E | 60 | 40 | 5B | 5D | 5B § | Ñ 5C | 7C ñ | 2A í | 7D ° |
| B | US11 | 21 | FF | 23 | 2A | 2B | 27 | 2A | 2B | 2F | 3D | 3F | 40 | FF | FF | 23 | FF |
| C | XCL12 | 21 | 22 | 23 | 24 | 25 | 27 | 2A | 2B | 2F | 3D | 3F | 40 | FF | FF | 5F | 60 |
| D | | 5E § | 5B ° | 60 | FF | FF | FF | 2A | FF | FF | 3D | FF | 40 | FF | 5C | FF | FF |
| E | | *2A | 5D ¢ | 2F | @40 | 23 £ | 24 $ | .27 | 1/4 5B | 1/2 5C | 3/4 7E | 25 % | 22 " | 7D # | 21 ; | 5F - | Ø1 |
| F | | 3D = | 3F ? | 2B + | FF | FF | FF | FF | FF | FF | FF | FF | FF | FF | FF | FF | CRC |

FIG. 8C

CODE: KB → MEDIA GERMAN ØII  3.6-2.2

| BITS HIGH ORDER / LOW ORDER HEX | HEX | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| | | ! | £ | S | * | + | ; | § | Ä | Ö | Ü | / | \ | ä | ö | ü | ß |
| 0 | | 21 | 23 | 24 | 2A | 2B | 3B | @ 40 | ¾ 7E | ÜC 3C | ⅓ 7B | ¢ 5D | üc 3E | ¼ 5B | ½ 5C | ⅔ 7C | # 7D |
| 1 | UK 1 | 21 | 23 | 24 | 2A | 2B | 3B | 40 | 5B | 5C | 5D | 5E | 60 | 7B | 7C | 7D | 7E |
| 2 | GWN 2 | 21 | 23 | 24 | ½ 7E | 2B | 3B | 5D | 5E | 5C | 7C | ê 7B | ° 5B | ¨ 3C | ⁰ 60 | ä 40 | ê 7D |
| 3 | FR 3 | 21 | Fr 24 | ¾ 7E | ¼ 5B | 2B | 3B | 2A | 5E | 5C | 60 | ê 7B | ° 5D | ¨ 3C | ½ 7C | ä 40 | ê 7D |
| 4 | BE 4 | 21 | 23 | 24 | ½ 7E | 2B | 3B | ⁿ 5B | 5E | § 40 | û 7C | é 7B | ¨ 5D | ¼ 5B | ° 5D | ° 60 | ê 7D |
| 5 | IT 5 | ¾ 7E | 23 | 24 | ½ 7E | 2B | 3B | 60 | 5E | § 5C | û 7C | é 7B | ° 3C | ¨ 3C | ° 5D | ° 40 | ½ 5D |
| 6 | SGT 6 | ¾ 7E | 23 | 24 | ½ 3B | 2B | 3B | 40 | 5B | § 5C | ¼ 3C | é 5B | 60 | 7B | ½ 5D | 7D | ½ 5D |
| 7 | SW 7 | ¾ 5E | 23 | 24 | 2A | 2B | ¼ 3C | 2A | 5B | § 5C | Å 5D | 40 | 60 | 7B | 7C | 7E | ê 7D |
| 8 | NE 9 | 21 | 23 | 24 | 2A | 2B | 3B | ¾ 7B | < 5E | § 5B | ¼ 5B | 40 | 60 | 3C | ⁰ 5D | ƒ 7D | # 23 |
| 9 | SP 10 | 21 | 23 | 24 | 22 | 2B | 3B | ¨ 3C | FF | üc 3C | ~ 5C | 40 | 60 | ¹ 2A | ⁰ 7D | ~ 7C | ° 5B |
| A | US 11 | 21 | FF | 24 | 5B | 23 | 24 | @ 40 | FF | üc 7C | üc 3C | ¢ 5D | üc 3E | ¼ 5B | ½ 5C | FF | FF |
| B | XCL 12 | üc 3E | 5D | 21 | ¾ 5B | º 7B | ¼ 3C | 27 | 2A | 2B | 2D | 2F | E^ 7D | < 5E | ẹ 5C | ` 60 | ° 5B |
| C | | 1B | 1A | 40 | 5B | 5C | 5D | 5E | 5F | 60 | 7B | 7C | 3A | 3B | 3C | 3D | FF |
| D | | 3E | 3F | 3B | 5B | 3D | 40 | 5E | 5F | 60 | 7B | 7C | FF | FF | FF | FF | 82 |
| E | PHY 1A | 18 | 22 | 5D | = 3D | ⁹ 40 | º 7B | − 2D | 60 | 7B | * 2A | ⁰ 5C | ? 3F | ′ 60 | FF |
| F | | 21 | 27 | ″ 22 | ü 5D | ü 7D | ' 2F | $ 24 | : 3A | £ 23 | * 2A | + 2B | FF | FF | FF | CRC |

FIG. 8D

CODE: KB → MEDIA: FRENCH ØII 3.6-2.3

| BITS HIGH ORDER / LOW ORDER HEX | | ! Ø | £ 1 | S 2 | + 3 | ; 4 | : 5 | à 6 | ° 7 | § 8 | ¶ 9 | < A | œ B | é C | ù D | è E | 1/2 F |
|---|---|---|---|---|---|---|---|---|---|---|---|---|---|---|---|---|---|
| | HEX | | | | | | | | | | | | | | | | |
| 0 | SK₁ | 21 | 23 | 24 | 2B | 3B | 1/4 5B | üc 3E | * 2A | ¢ 5D | üc 3C | 3/4 7E | 1/3 7B | # 7D | 2/3 7C | @ 4Ø | 5C |
| 1 | GE₂ | 21 | 23 | 24 | 2B | 3B | Â 5B | ö 7C | ö 5C | / 5E | 4Ø | ö 7B | ü 5D | ` 6Ø | β 7E | ü 7D | * 2A |
| 2 | LR₃ | 21 | 23 | 24 | 2B | 3B | 3C | 4Ø | 5B | 5C | 5D | 5E | 6Ø | 7B | 7C | 7D | 7E |
| 3 | BW₄ | 21 | 3/4 7E Fr | 24 | 2B | 3B | 3C | 4Ø | 5D | 5C | 2A | 5E | 6Ø | 7B | 6Ø | 7D | 7C |
| 4 | -T₅ | 21 | 23 | 24 | 2B | 3B | 3C | 7C | 5C | 5C | ° 5D | 5E | 1/4 5B | 7B | 7C | 7D | 7E |
| 5 | SF₆ | * 2A | 23 | 24 | 2B | 3B | 3C | 4Ø | 3/4 7E | 4Ø | 6Ø | 5E | 1/4 5B | 7B | 7C | ü 7D | 5D |
| 6 | SG₇ | * 2A | 23 | 24 | 2B | 3B | ° 7E | ö 7C | ` 6Ø | 5C | 4Ø | ö 7B | 1/4 5B | 5B | ä 7B | ü 7E | 5D |
| 7 | XC₈ | ô 7D | 23 | 24 | 2B | 3B | 1/4 5B | ' 4Ø | 3/4 7B | 4Ø | 2A | 5E | Å 5D | ` 6Ø | 1/4 3C | üc 3E | 3B |
| 8 | NL₉ | 21 | 23 | 24 | 2B | 3B | 3C | ' 4Ø | ¿ 7E | 5C | 1/4 5B | 5E | ˆ 7D | ` 6Ø | ü 7C | ' 2A | 5D |
| 9 | SP₁₀ | 21 | 23 | 24 | 2B | 3B | 3C | üc 3E | * 2A | 5B | üc 3C | 5E | ° 7D | ` 6Ø | ñ 7C | @ 4Ø | 5D |
| A | US₁₁ | * 2A | FF | 24 | 2B | 3B | üc 7E | ¢ 7C | 5B | 5C | üc 3E | FF | FF | # 23 | FF | é 7D | 5C |
| B | XC₁₂ | ù 7D | * 5D | 24 | 2B | 3B | û 7C | ς 7C | 2A | 5E | 5B | 5E | üc 3C | 7B | @ 4Ø | 7D | 6Ø |
| C | | 19 | 1A | 21 | 23 | 24 | 27 | 29 | 2A | 2B | 2D | 2E | 2F | 3A | 3C | 3D | FF |
| D | | 3E | 3F | 4Ø | 41 | 51 | 5B | 5C | 5D | 5E | 5F | 6Ø | 61 | 71 | 7B | 7C | 43 |
| E | PHY 1A | 19 | ' 2D | ° 7D | ς 5C | ¨ 5C | ¨ 27 | 5F | 5D | = 3D | : 3A | b 4Ø | . 2E | ! 27 | FF |
| F | / 2F | + 2B | e' 7B | q 51 | A 41 | :. 3C | < 5E | ? 3F | $ 24 | ° 5B | £ 23 | ¶ 71 | @ 61 | æ 6Ø | 1/2 7E | CRC |

FIG. 8E

CODE: KB — MEDIA: BELGIAN 0 II  3.6-2.4

| BITS HIGH ORDER / LOW ORDER HEX | | ! 0 | Fr 1 | § 2 | + 3 | ; 4 | ·· 5 | ò 6 | 1/4 7 | § 8 | ° 9 | < A | ù B | é C | è D | è E | 3/4 F |
|---|---|---|---|---|---|---|---|---|---|---|---|---|---|---|---|---|---|
| 0 | UK 1 | 21 | # 7D | üc 3C | 2B | 3B | 1/3 7B | * 2A | 5B | £ 23 | $ 24 | 2/3 7C | üc 3E | @ 40 | 5C | ¢ 5D | 7E |
| 1 | GW 2 | 21 | À 5B | 40 | 2B | 3B | ö 5C | * 2A | ü 7D | £ 23 | $ 24 | ö 7C | 7E | ' 5E | ö 7B | 5D | ü 5D |
| 2 | FR 3 | 21 | 23 | 5D | 2B | 3B | 3C | 40 | § 60 | 5C | 5B | 5E | 7E | 7B | 7E | 60 | $ 24 |
| 3 | IT 4 | 21 | 24 | 2A | 2B | 3B | 3C | 40 | 5B | 5C | 5D | 5E | 7C | 7B | 7C | 7D | 7E |
| 4 | -TS 5 | 21 | 23 | ° 5D | 2B | 3B | 3C | 60 | ~ 5B | 40 | $ 24 | 5E | 7C | 7B | 7E | 7D | $ 24 |
| 5 | SL 6 | * 2A | 23 | ° 60 | 2B | 3B | 3C | 40 | 5B | 5C | $ 24 | 5E | 7C | 5B | 5D | 7D | 7E |
| 6 | SG 7 | ö 7B | 23 | 40 | 2B | 3B | ö 7C | * 2A | 5B | 5C | $ 24 | 5E | ü 7D | 7B | 5D | 60 | 7E |
| 7 | SW 8 | ö 7B | Å 5B | 2A | 2B | 3B | ö 5C | @ 7D | 7C | 23 | Ä 5D | 7C | ü 7E | 5B | 3B | 60 | 5E |
| 8 | ZU 9 | 21 | 23 | ' 7D | 2B | 3B | 3C | * 2A | 5B | 5C | $ 24 | 5E | üc 3E | @ 40 | 5D | 60 | 7B |
| 9 | SP 10 | 21 | 23 | ' 2A | 2B | 3B | 3C | ° 7B | 5B | 5B | $ 24 | FF | ° 7D | 7B | 5D | 60 | ~ 5C |
| A | US 11 | 21 | # 23 | üc 3C | 2B | 3B | üc 7C | * 2A | 5B | 5C | $ 24 | 5E | üc 3E | @ 40 | 5C | é 7D | $ 24 |
| B | XL 12 | * 2A | üc 3C | üc 3E | 23 | 24 | 27 | 29 | 2A | 2D | 2E | 2F | 3A | 3C | 3E | 3F | FF |
| C | | 19 | 1A | 21 | 5B | 5C | 27 | 29 | 2A | 2D | 2E | 2F | 3A | 3C | 3E | 3F | FF |
| D | | 40 | 41 | 51 | 5B | 5C | 5D | 60 | 5F | 2A | 61 | ¼ 5B | 7B | 3A | 2F | FF | 44 |
| E | | PHY 1A | 19 | 2D | ' 7D | § 5C | ? 3F | ' 27 | — | ) 29 | ; 3A | ° 61 | ° 40 | , 2E | / 2F | 3/4 7E | FF |
| F | | é 7B | 51 | A 41 | ' 3C | < 5E | ~ 60 | . 21 | ° 5D | § 2A | 9 71 | 61 | Fr 24 | FF | FF | FF | CRC |

FIG. 8F

CODE: KB → MEDIA: ITALIAN ∅ II  3.6 - 2.5

| BITS HIGH ORDER / LOW ORDER HEX | 0 ·,¡ | 1 £ | 2 $ | 3 + | 4 ; | 5 : | 6 § | 7 ) | 8 ° | 9 ò | A < | B ò | C é | D ù | E è | F 1/2 |
|---|---|---|---|---|---|---|---|---|---|---|---|---|---|---|---|---|
| HEX | | | | | | | | | | | | | | | | |
| 0 UK- | 21 | 23 | 24 | 2B | 3B | 1/3 7B | *2A | ¢ 5D | Üc 3C | 3/4 7E | 2/3 7C | Üc 3E | # 7D | 1/4 5B | @ 40 | 5C |
| 1 GE 2 Ö | Ö 5C | 23 | 24 | 2B | 3B | Ü 5D | *2A | 7E | Ä 5B | ö 7C | ü 7D | ö 7B | 5E | ! 21 | 60 | § 40 |
| 2 FR 3 | 21 | 23 | 24 | 2B | 3B | 3C | 5C | œ 60 | 5B | § 5D | 5E | 40 | 7B | 7C | 7D | 7E |
| 3 BE 4 Fr | 21 | Fr 24 | 1/4 5B | 2B | 3B | 3C | 5C | § 2A | 5D | 3/4 7E | 5E | 40 | 7B | 60 | 7D | 7C |
| 4 — + 5 | 21 | 23 | 24 | 2B | 3B | 3C | 40 | 5B | § 60 | 3/4 | 5E | 60 | 7B | 7C | 7D | 7E |
| 5 SF 6 1/4 | 1/4 5B | 23 | 24 | 2B | 3B | 3C | 5C | *2A | § 40 | 3/4 7E | 5E | 40 | 7B | 7C | 7D | 5D |
| 6 SG 7 3/4 | 3/4 7 | 23 | 24 | 2B | 3B | 1/4 3C | 5C | ü 7D | Ä 5B | ö 7C | 5E | ö 7B | 5B | *2A | 60 | 5D |
| 7 SW 8 Ö | Ö 5C | 23 | 24 | 2B | 2A | Å 5D | 1/4 3C | ü 7E | f 7 | 3/4 | å 7D | ij 7 | 40 | 3/4 5E | 7D | 3B |
| 8 NE 9 | 21 | 23 | 24 | 2B | 3B | 3C | 5 | Üc 3 | Ñ 5C | 7D | 5 | q 7B | 40 | 1/4 5B | 60 | 5D |
| 9 SP 10 | 21 | 23 | 24 | 2B | 3B | 3C | 5B | ñ 7C | Üc 3C | FF | FF | Üc 3E | 40 | ¿ 7E | 60 | 5D |
| A ÿ = 11 | 21 | FF | 24 | 2A | 3B | FF | *2A | ¢ 5D | 5B | 60 | 5E | Ś 7C | 23 | 1/4 5B | @ 40 | 5C |
| B XC J 12 Üc | Üc 3C | 1A | 21 | 23 | 24 | Üc 7E | 27 | 29 | 2A | 2B | 2D | 2E | 2F | 3A | 3C | Üc 3E |
| C | 19 | 3E | 3F | 40 | 5B | 26 | 5D | 5E | 5F | 60 | 7B | 7C | FF | FF | 3C | FF |
| D | 3D | 3E | 3F | 40 | 5B | 5C | 5D | 5E | | 60 | 7B | 7C | FF | FF | FF | 45 |
| E PHY 1A | PHY 1A | 19 | 2D | 7D | 40 | £ 23 | ù 7C | 27 | | 3C | 78 | 3A | 2F | 60 | 2E | FF |
| F < 5E | < 5E | / 2F | ;21 | é 7B | = 3D | 1/4 5B | ?3F | $ 24 | ° 5C | § 26 | + 2B | 1/2 7E | ° 5D | ° 60 | FF | CRC |

FIG. 8G

CODE: KB → MEDIA: SWISS FRENCH 0 II  3.6-2.6

| BITS HIGH ORDER / LOW ORDER HEX | HEX | £ 0 | $ 1 | * 2 | + 3 | ; 4 | : 5 | b 6 | ¼ 7 | ₴ 8 | ½ 9 | ∧ A | § B | é C | ù D | è E | ¾ F |
|---|---|---|---|---|---|---|---|---|---|---|---|---|---|---|---|---|---|
| | HEX | 0 | 1 | 2 | 3 | 4 | 5 | 6 | 7 | 8 | 9 | A | B | C | D | E | F |
| J K 1 | 0 | 23 | 24 | 2A | 2B | 3B | ůC 3C | ! 21 | 5B | @ 40 | 5C | • 5D | ůC 3E | # 7D | ⅓ 7B | ⅔ 7C | 7E |
| GW 2 | 1 | 23 | 24 | 2A | 2B | 3B | Ä 5B | ! 21 | ü 7D | 7E | ' 5E | ö 7B | 40 | ' 60 | ö 5C | ö 7C | ü 5D |
| LR 3 | 2 | 23 | 24 | 2A | 2B | 3B | 3C | ! 21 | ß 60 | 5C | 7E | 5E | 5D | 7B | 7C | 7D | ° 5B |
| GW 4 | 3 | Fr 24 | 2A | 2B | 3B | 3C | 40 | 5B | 5C | 7C | 5E | 2A | 7B | 60 | 7D | ° 5C |
| I T 5 | 4 | ° 5 | 24 | ! 21 | 2B | 3B | 3C | 40 | ` 5B | 5C | 7E | 5E | ° 5D | ` 60 | 7C | 7D | ° 5E |
| SL 6 | 5 | 23 | 24 | 2A | 2B | 3B | 3C | 60 | 5B | 5C | 5D | 5E | 60 | 7B | 7C | 7D | 7E |
| SG 7 | 6 | 23 | 24 | 2A | 2B | 3E | ö 60 | 40 | 3C | 5C | 3B | 7B | 40 | 7B | 7C | ii 7C | 7E |
| S 8 | 7 | 23 | 24 | 2A | 2B | 3B | ä 5B | ß 7D | 3C | ' 40 | 5D | 7B | 2A | 7B | f 7D | ö 7C | 5E |
| Z N 9 | 8 | 23 | 24 | 5D | 2B | 3B | ' 60 | ' 40 | 5B | 5C | 5D | 5E | ůC 3E | ' 60 | 7D | 7C | 7B |
| SP 10 | 9 | 23 | 24 | ! 21 | 2B | 3B | ä 5B | ! 21 | ° 7B | @ 40 | 5C | 5E | è 7E | # 23 | Ñ 5C | ñ 7C | ° 7D |
| US 11 | A | FF | 24 | 2A | 22 | 23 | ůC 3C | ! 21 | 5B | @ 40 | 5C | 5D | ůC 3E | 7B | FF | - 60 | FF |
| KU 12 | B | ů 5D | 1A | 21 | 5B | 5C | 24 | 27 | 5F | 2B | 2D | 2F | FF | 3B | 3C | 3D | ç 7C |
| | C | 18 | 3F | 40 | 5B | 5C | 5D | 5E | 5F | 60 | 7B | 7C | 60 | 3C | 3C | 3D | FF |
| | D | 3E | 18 | + 2B | 3A | ý 5C | 2A | ð 40 | 5F | ½ 5D | ε 7D | - 2D | ᴇ 60 | FF | 3F | é 7B | 86 |
| | E | PHY 1A | = 3D | " 22 | ü 7C | é 5C | / 2F | $ 24 | 3C | £ 23 | ¾ 7E | ¼ 5B | FF | FF | ? 3F | FF | FF |
| | F | 3B | 3D | 22 | 7C | 7D | 2F | 24 | 3C | 23 | 7E | 5B | FF | FF | FF | FF | CRC |

FIG. 8H

CODE: KB → MEDIA: SWISS GERMAN ⊘II    3.6-2.7

| BITS HIGH ORDER / LOW ORDER HEX | 0 £ | 1 $ | 2 * | 3 + | 4 ; | 5 1/4 | 6 ò | 7 é | 8 § | 9 1/2 | A < | B ` | C ö | D ö | E ü | F 3/4 |
|---|---|---|---|---|---|---|---|---|---|---|---|---|---|---|---|---|
| 0 JK 1 | 23 | 24 | 2A | 2B | 3B | 5B | üc 3E | 2/3 7C | 1/3 7B | 5C | üc 3C | @ 40 | ! 21 | ¢ 5D | # 7D | F |
| 1 GW 2 | 23 | 24 | 2A | 2B | 3B | 7E | 40 | ' 5E | ö 5C | ! 21 | Ä 5B | 60 | 7B | 7C | 7D | ü 7E |
| 2 LR 3 | 23 | Fr 24 | ! 21 | 2B | 3B | ∞ 60 | 5D | 7B | 5C | 7E | 5E | 7D | ¨ 40 | ⸗ 3C | ¨ 7C | ° 5B |
| 3 BE 4 | 5 | 24 | ! 21 | 2B | 3B | 5B | 2A | 7B | 40 | 7C | 5E | ● 7D | ¨ 40 | ⸗ 3C | ¨ 7C | ° 7E |
| 4 T 5 | 23 | 24 | 2A | 2B | 3B | ˜ 5B | ˙ 5D | 7B | 5C | 7E | 5E | ● 7D | ˙ 60 | ⸗ 3C | ˙ 7C | ° 5C |
| 5 SL 6 | 23 | 24 | 2A | 2B | 3B | 5B | 60 | 7B | 5C | 5D | 5E | ● 7D | ˙ 40 | ⸗ 3C | ˙ 7C | ° 7E |
| 6 SG 7 | 23 | 24 | 2A | 2B | 3B | 3C | 40 | 5B | 5C | 3B | 5E | 60 | 7B | 7C | 7D | 7E |
| 7 SW 8 | 23 | 24 | ' 40 | 2B | ö 5C | 3C | 2A | 5B | Ä 5D | 5D | Ä 5B | 60 | 7B | 7C | 7D | 7E |
| 8 NE 9 | 23 | 24 | ! 21 | 2B | 3B | 5B | üc 3E | ' 40 | 5C | 5D | 5E | 60 | 7B | 7C | 7D | 5E |
| 9 SP 10 | 23 | 24 | ! 21 | 2B | 3B | 2A | ñ 5C | ' 40 | 5B | 5D | 5E | 60 | " 7B | 7C | ñ 7C | ? 7B |
| A US 11 | FF | 24 | 2A | 2B | 3B | 5B | üc 3E | FF | FF | 5C | üc 3C | 60 | ! 21 | 7C | # 23 | üc 7E |
| B XCJ 12 | 5D | 24 | 21 | 22 | 23 | 5E | ç 7B | 5B | ε 7D | ˙ 3E | 2F | 3A | @ 40 | ¢ 5D | § 5C | é 7E |
| C | 18 | 1A | 40 | 5B | 5C | 24 | 27 | 2A | 28 | 2D | 7C | 3A | 3B | 3C | 3D | FF |
| D | 3E | 3F | 3B | 5B | 5D | 27 | 5E | 5F | 60 | 7B | 2D | + 2B | 7C | 3F | FF | 87 |
| E | 1A | 1B | 3B | 3A | - 2F | - 7B | - 3C | - 5F | § 5C | £ 23 | $ 24 | FF | :° 7C | ? 3F | ● 5B | FF |
| F | 1/2 5D | = 3D | " 22 | § 40 | ü 7D | 1/2 2F | 1/4 3C | < 5E | 3/4 7E | £ 23 | $ 24 | FF | FF | FF | FF | CRC |

FIG. 8I

CODE: KB — MEDIA: SWEDISH Ø II    3.6-2.8

| BITS HIGH ORDER / LOW ORDER HEX | HEX | 0 £ | 1 $ | 2 § | 3 + | 4 1/2 | 5 1/4 | 6 ' | 7 Ä | 8 Ö | 9 Å | A 3/4 | B , | C ö | D ó | E å | F ü |
|---|---|---|---|---|---|---|---|---|---|---|---|---|---|---|---|---|---|
| 0 | UK 1 | 23 | 24 | ÜC 3 | 2B | 5C | 5B | 5D | ;3B | ÜC 3C | !21 | 7E | *2A | 1/3 7B | 2/3 7C | @40 | #7D |
| 1 | GW 2 | 23 | 24 | 40 | 2B | 2A | 5D | 5E | ;5B | 5C | !21 | β7E | 60 | 7B | 7C | ;3B | 7D |
| 2 | FR 3 | 23 | Fr 24 | 5D | 2B | 7E | 3C | °7B | ;3B | §5C | !21 | α60 | °7D | °40 | <5E | °5B | °7C |
| 3 | BW 4 | ..3C | 24 | 2A | 2B | 7C | 5B | °7B | ;3B | §5C | !21 | °5D | °7D | °40 | <5E | °5D | °60 |
| 4 | -I 5 | 23 | 24 | 5B | 2B | 7E | 3C | °7B | ;3B | $40 | *2A | 7E | °7D | °60 | <5E | °5C | °7C |
| 5 | SW 6 | 23 | 24 | 60 | 2B | 5D | 5B | °5B | ;3B | §5C | *2A | 7E | 60 | °40 | <5E | ..3C | °7C |
| 6 | SG 7 | 23 | 24 | 40 | 2B | 5D | 3C | 40 | 5B | 5C | 5D | 5E | 60 | 7B | 7C | <5E | 7D |
| 7 | SW 8 | 23 | 24 | 2A | 2B | 3B | 3C | 40 | ;3B | §5C | *2A | 7B | 60 | 7B | 7C | <5E | 7E |
| 8 | NE 9 | 23 | 24 | ÜC 3E | 2B | 5D | 5B | 5D | ;3B | §5C | !21 | 7B | *2A | "7C | <5E | "3C | f 7D |
| 9 | SP 10 | 23 | 24 | ¿ 7E | 2B | 5D | 3C | 7B | ;3B | §5B | ÑC 5C | :21 | É 7D | ª 7B | <5E | Ñ 7C | º 7D |
| A | US 11 | FF | 24 | 40 | 2A | 5C | 5B | 40 | 5B | ÜC 7E | *2A | 60 | *2A | FF | FF | @40 | #23 |
| B | XL 12 | ε 7C | 24 | 3E | 2B | 5D | ÜC 3C | °7B | 5F | Ω 5B | :21 | 60 | É 7D | @40 | <5E | °5B | £ 5C |
| C |  | 19 | 1A | 21 | 22 | 23 | 24 | 25 | 26 | 27 | 28 | 29 | 2A | 2B | 2C | 2D | FF |
| D |  | 2E | 2F | 3B | 3C | 3D | 3E | 3F | 40 | 5B | 5C | 5D | 5F | 60 | 7B | 7C | Ø8 |
| E |  | 1A | 19 | 24 | ?3F | 3D | %25 | ( 28 | | 5F | .2E | '2F | )29 | '27 | 1/4 3C | 7B | "22 | FF |
| F |  | ö 7B | ö 7C | ',2C | Å 5D | ',40 | Ä 5B | ö 5C | 1/2 3B | +2B | =3D | -2D | '27 | 1/4 3C | £ 23 | ü 7E | CRC |

FIG. 8J

CODE: KB → MEDIA: NETHERLANDS 0 II  3.6 - 2.9

| BITS HIGH ORDER / LOW ORDER HEX | HEX | 0 — | 1 £ | 2 $ | 3 + | 4 ; | 5 : | 6 ùċ | 7 / | 8 ¼ | 9 § | A ½ | B < | C ' | D ¾ | E ij | F f |
|---|---|---|---|---|---|---|---|---|---|---|---|---|---|---|---|---|---|
| 0 | UK 1 | 21 | 23 | 24 | 2B | 3B | *2A | 3E | ¢5D | 5B | #7D | 5C | ùċ3C | ª40 | 7E | 2/3 7C | 1/3 7B |
| 1 | GE 2 | 21 | 23 | 24 | 2B | 3B | º7B | §40 | 5E | *2A | ü7D | β7E | Ä5B | 60 | 7E 5D | ö7C | ö5C |
| 2 | FR 3 | 21 | Fr 24 | 24 | 2B | 3B | 3C | ª40 | è7B | æ60 | ù7D | 7E | 5E | è7D | ç5D | ù7C | ù5B |
| 3 | BE 4 | 21 | 23 | 24 | 2B | 3B | 3C | ª40 | è7B | 5B | 5C | 7C | 5E | è7D | 7E | ù60 | °5D |
| 4 | IT 5 | 21 | 23 | 24 | 2B | 3B | 3C | ì5B | è7B | º60 | 40 | 7E | 5E | è7D | °5D | °7C | §5C |
| 5 | SF 6 | *2A | 23 | 24 | 2B | 3B | 3C | ª40 | 40 | 5B | 5C | 5D | 5E | 60 | 7B | ù7C | ù5C |
| 6 | SG 7 | *2A | 23 | 24 | 2B | 3B | 3C | §40 | 40 | 5B | 5C | 5D | 5E | 60 | 7E | ö7C | §60 |
| 7 | SW 8 | §2A | 23 | 24 | 2B | ü7E | ä7B | Å5D | 5B | 3C | #7D | 3B | Ä5B | 60 | 5E | ö7C | ö5C |
| 8 | NE 9 | 21 | 23 | 24 | 2B | 3B | 3C | 3E | 40 | 5B | 5C | 5D | 5E | 60 | 7B | 7C | 7D |
| 9 | SP 10 | 21 | 23 | 24 | 2B | 3B | 3C | ñ7E | ¢7B | 5B | 5B | 5D | 5E | 60 | º7B | 7C | ñ5C |
| A | US 11 | 21 | FF | 24 | 2B | 3B | *2A | 3E | 40 | ùċ3C | #23 | 60 | ùċ3C | @40 | FF | FF | FF |
| B | XCL 12 | *2A | ¢5D | 24 | 2B | 3B | 5E | ê7E | ¢7B | 5B | 5C | 5F | 7E | é7D | 7C | @40 | 5B |
| C |  | 18 | Λ | 22 | 23 | 24 | 25 | 26 | 27 | 28 | 29 | 2A | 2B | 2D | 2F | 3A | FF |
| D |  | 3B | 3C | 3D | 3F | 40 | 5C | 5D | 5E | 5F | 60 | 7B | 7C | FF | FF | FF | 09 |
| E |  | 1A | 18 | 3A | 3D | %25 | §26 | ) 29 | ; 3B | +2B | / 2F | _5F | < 5E | ' 40 | ' 2D | ¢ 7D | FF |
| F | ij7C | ?3F | ¨3C | 3C | " 22 | 1/2 5D | ( 28 | § 5C | ' 60 | 3/4 7B | £ 23 | $ 24 | FF | FF | FF | FF | CRC |

FIG. 8K

CODE: KB — MEDIA: SPANISH 0 II    3.6-2.10

| BITS HIGH ORDER / LOW ORDER HEX | HEX | 0 £ | 1 £ | 2 $ | 3 ¡ | 4 ; | 5 : | 6 ' | 7 § | 8 Ñ | 9 ½ | A < | B ´ | C ¡ | D ñ | E ¡ | F ¿ |
|---|---|---|---|---|---|---|---|---|---|---|---|---|---|---|---|---|---|
| 0 | JK 1 | 21 | 23 | 24 | 5D ¢ | 3B | 7B 1/3 | 7D # | 2B + | 5B 1/4 | 5C + | 7C 2/3 | 3C ÙC | 40 @ | 7E 3/4 | 2A * | 3E ÙC |
| 1 | GW 2 | 21 | 23 | 24 | 7B ö | 3B | 2A * | 5E | 7E β | 5C ö | 2B + | 40 § | 60 | 7C ö | 5D ü | 5D ü | 5B Á |
| 2 | FR 3 | 21 | 23 | 24 | 7C ü | 3B | 3C | 7B è | 5C | 2B + | 7E | 40 | 7D è | 60 ö | 5B | 5B ° | 5D §|
| 3 | BW 4 | 2B + | 24 Fr | 2B + | 60 ù | 3B | 3C | 7B è | 40 | 2B + | 7C | 5E | 7D è | 40 ò | 5B | 5D ° | 2A §|
| 4 | TR 5 | 2A * | 23 | 24 | 7C ú | 3B | 3C | 7B é | 5C | 2B + | 7C | 5E | 7D é | 40 ò | 5B i | 5C ° | 5D δ |
| 5 | FG 6 | 2A * | 23 | 24 | 7C ú | 3B | 3C | 5B | 2A § | 7E 3/4 | 5D | 5E | 60 | 60 ò | 5B 1/4 | 5B ° | 2A δ |
| 6 | SG 7 | 21 | 23 | 24 | 7B ö | 3B 3/4 | 40 § | 40 | 5C § | 5C ö | 3B | 5E § | 60 é | 60 ò | 7C ö | 60 § | 7E 3/4 |
| 7 | SW 8 | 21 | 23 | 24 | 7D ü | 3B | 3C | 40 | 5B | 5C | 5D | 5E | 60 | 2B + | 7C ü | 7D | 3C 1/4 |
| 8 | ZW 9 | 21 | 23 | 24 | 2A f | 3B | 3C ÛC | 7B | 2B + | 5B 1/4 | 5C | 5E | 7D | 7B | 7E | 7D | 7E |
| 9 | SP 10 | 21 | FF | 24 | 5B ¢ | 3B | FF 7E ÛC | 7B | 2B + | 5C § | 5C | FF | 3C ÙC | 40 | 7C | 2A * | 3E ÙC |
| A | US 11 | 2A * | 3E ÛC | 23 | 2A | 3B 3/4 | 7E ÛC | 7B | 2B + | 5B | 5D | 5E | 7D é | 40 | 7C | 5B | 3C ÙC |
| B | XC 12 | | 22 | 23 | 24 | 25 | 26 | 27 | 28 | 29 | 2A | 2B | 2C | | | | |
| C | | 3C | 3D | 3E | 3F | 40 | 5B | 5C | 5D | 5E | 5F | 60 | 2D | 2E | 3A | 3B | FF |
| D | | 23 | 3C | 25 | 26 | 22 | | 5C | 27 | 29 | 3D | 7D | 7B | 2E | 3A | 7C ñ | 0A |
| E | | £ 23 | a 7B | / 2F | § 3A | " 22 | ` 60 | ' 5E | ) 29 | 1/2 5D | - 2D | $ 24 | ¿ 7E | ; 2A | FF | FF | FF |
| F | | ¿ 3F | | | | | | | | | | | | | | | CRC |

FIG. 8L  3.6-2.12

CODE: KB → MEDIA: FRENCH CANADIAN ØII

| BITS HIGH ORDER / LOW ORDER HEX | $ 0 | * 1 | + 2 | ; 3 | UC 4 | UC 5 | o 6 | ° 7 | ç 8 | ¢ 9 | < A | ) B | é C | ç D | è E | ÛC F |
|---|---|---|---|---|---|---|---|---|---|---|---|---|---|---|---|---|
| UX 0 | 24 | 2A | 2B | 3B | ÙC 3C | 3E | 40 | ! 21 | 1/2 5C | 5D | 2/3 7C | # 7D | 3/4 7E | 1/4 5B | £ 23 | 1/3 7B |
| GW 1 | 24 | 2A | 2B | 3B | β 7E | § 40 | Å 5B | ! 21 | ü 7D | 1/2 7B | ö 7C | 7D | 5E | ü 5D | £ 23 | ö 5C |
| FR 2 | 24 | ! 21 | 2B | 3B | é 7D | § 5D | œ 60 | 5B | 5C | 1/2 7E | 5E | ` 60 | 7B | ù 7C | £ 23 | `` 3C |
| BW 3/4 7E 3 | 24 | ! 21 | 2B | 3B | è 7D | § 60 | 1/4 5B | 5D | 5C | 1/2 7C | 5E | ` 40 | 7B | ù 7C | Fr 24 | `` 3C |
| IT 4 | 24 | ! 21 | 2B | 3B | ö 7B | 1/2 7E | ) 5B | 5E | 40 | ò 5D | 5E | ` 40 | 7B | ù 7C | £ 23 | `` 3C |
| SF 5 | 24 | ! 21 | 2B | 3B | f 7D | § 60 | 1/4 5B | 7B | 5C | 1/2 5D | 5E | 60 | 7B | ä 5B | £ 23 | ö 5C |
| SG 6 | 24 | ! 21 | 2B | 3B | ò 7B | § 40 | 1/4 3C | 3/4 7E | ö 7B | 1/2 3B | ö 7C | 60 | 7E | ü 7D | £ 23 | `` 3C |
| SW 7 | 24 | , 40 | 2B | 3B | Å 5D | § 2A | 1/4 3C | 3/4 5E | ö 7C | ñ 7C | 5E | 60 | ' 40 | 1/2 7C | £ 23 | ö 7C |
| NE 8 | 24 | ! 21 | 2B | 3B | f 7D | 3E | 5B | 3/4 7B | 5C | 5D | 5E | 60 | ' 40 | 1/4 5B | £ 23 | 5C |
| SP 9 | 24 | ! 21 | 2B | 3B | ð 7B | 2F 7D | 40 | ! 21 | 5B | 1/2 5C | FF | * 23 | 7B | 1/4 5B | £ 23 | 3C |
| US A | 21 | 22 | 23 | 27 | 3C | 2F | 3C | 5B | 3F | 40 | 5E | 5D | 7B | 7C | 7D | 7E |
| XC B | 7C | FF | FF | FF | 2B | FF | 3C | 3D | FF | FF | FF | FF | 5E | 60 | FF | FF |
| C | ° 5B | ÛC 3C | , 2F | ` 60 | @ 40 | ˆe 7B | – 27 | ¢ 5D | £ 7D | " 22 | ç 7C | ¿ 3F | ˝ 3D | + 2B | ˝ 7E | 0C |
| D | < 5E | FF | FF | FF | FF | FF | FF | FF | FF | FF | FF | FF | FF | FF | ˆe 7E | FF |
| E |  |  |  |  |  |  |  |  |  |  |  |  |  |  |  |  |
| F |  |  |  |  |  |  |  |  |  |  |  |  |  |  |  | CRC |

FIG. 8M

CODE: MEDIA TO SYSTEM (PRINTER DATA ADDRESS) CONVERSION  3.6-3

| BITS HIGH ORDER HEX → LOW ORDER HEX ↓ | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | * | | | | UC | | | | | | | | | | | |
| 0 | 23 | 24 | 2A | 3B | 3C | 3E | 40 | 5B | 5C | 5D | 5E | 60 | 7B | 7C | 7D | 7E |
| 1 | £ 60 | $ 24 | * 2A | ; 3B | UC 3C | ÜC 8F | 1/4 40 | 1/4 5B | 1/2 5C | 5D | 5F | ■ 5F | 1/3 7B | 2/3 7C | # 23 | 3/4 7E |
| 2 | £ 60 | $ 24 | * 2A | ; 3B | ¨ 5F | ■ 5F | § 8D | Ä 0B | ¨O 0C | ü 0D | ' 88 | ' 89 | ä 8C | ö 1C | ü 1D | ß 10 |
| 3 | £ 60 | $ 24 | * 2A | ; 3B | ■ 1B | ■ 5F | ò 8A | ● 8E | § 19 | ● 8D | ' 88 | ● 11 | è 8B | ù 17 | è 7D | 1/2 5C |
| 4 | Fr 04 | $ 24 | § 8D | ; 3B | ¨ 1B | ■ 5F | ò 8A | 1/4 5B | § 19 | ° 8E | < 5E | ú 17 | è 8B | 1/2 5C | è 7D | 3/4 7E |
| 5 | ■ 5F | $ 24 | ■ 5F | ; 3B | ■ 1B | ■ 5F | § 19 | ↑ 15 | § 19 | ò 16 | < 5E | ù 8A | ● 8B | ü 1C | è 7D | 1/2 5C |
| 6 | £ 60 | $ 24 | * 2A | ; 3B | ■ 1B | ■ 5F | ò 8A | ● 8B | § 19 | 1/2 5C | < 5E | ò 8D | è 8B | ö 1C | è 7D | 3/4 7E |
| 7 | £ 60 | $ 24 | § 8D | 1/2 5C | 1/4 5B | ■ 5F | § 8D | 1/4 5B | § 0F | 1/2 5C | < 5E | ' 89 | è 8C | ij 12 | ü 1D | 3/4 7E |
| 8 | £ 60 | $ 24 | ■ 5F | ; 3B | ¨ 1B | ■ 5F | ' 88 | 1/4 5B | 1/2 5C | 1/2 5C | < 5E | ' 89 | ● 8C | ● 1C | è 7D | ¨ü 1D |
| 9 | £ 60 | $ 24 | ' 01 | ; 3B | ■ 1B | ■ 5F | ' 88 | 1/4 5B | § 19 | ● 5C | < 5E | ' 89 | ● 7E | ● 13 | ● 18 | 5F |
| A | £ 60 | $ 24 | * 2A | 1/2 5C | 1/4 5B | UC 3E | @ 40 | 1/4 5B | 1/2 5C | Å 08 | 3/4 7E | ' 89 | ● 7E | ● 13 | f 03 | ^ 02 |
| B | # 23 | $ 24 | * 2A | ; 3B | UC 0A | UC 3E | @ 40 | 8E | § 19 | ● 5D | < 5E | ' 89 | ● 5F | ● 1F | ● 14 | ● 5F |
| C | ■ 5F | FF | FF | FF | FF | FF | FF | FF | FF | FF | FF | FF | § 09 | § 5F | ¨UC 1E | |
| D | FF | FF | FF | FF | FF | FF | FF | FF | FF | FF | FF | FF | FF | FF | FF | FF |
| E | FF | FF | FF | FF | FF | FF | FF | FF | FF | FF | FF | FF | FF | FF | FF | FF |
| F | FF | FF | FF | FF | FF | FF | FF | FF | FF | FF | FF | FF | FF | FF | FF | CRC |

\* ROW Ø LOCATIONS CONTAIN MEDIA CODES
O/P CODES Ø1 THRU 7F ARE PRINTER DATA ROM ADDRESSES FOR FIXED SPOKE CHARACTERS.
8X DENOTE VARIABLE SPOKE ADDRESSES
5F OUTPUT CODES (UNDERSCORED SPACES) ARE ERROR FLAGS (WRONG LANG. MODE SELECTED)

FIG. 8N

LANGUAGE TRANSLATING APPARATUS AND METHODS THEREFOR

This invention is directed to language translating apparatus and methods therefor and more particularly, apparatus, operating methods and program steps of operation for adapting word processing systems developed in accordance with the requirements of a particular country to accept keyboard inputs in accordance with the standards of other nations and to cause such word processing equipment to implement appropriate word processing operations in response thereto. Furthermore, the language translating apparatus and methods therefor provided by the instant invention result, when combined with appropriate word processing equipment, in automatic writing systems which are truly international in that the same may achieve word processing functions specifically tailored to the requirements of any of a plurality of countries.

State of the art advancements in automatic word processing equipments which employ microprocessor technology have led to truly remarkable apparatus which is capable of quickly and easily formatting, editing and revising rough draft documentation into final copy. Additionally, during processing operations, automatic margin control, justification, automatic underscoring, centering and the formatting of statistical information may be implemented under program control to thereby markedly reduce the time expenditure by an operator for the preparation of documents in a final format and hence, quickly reduce the per document cost associated with such preparation. By necessity, automatic word processing equipment according to the foregoing type is quite complex in that the same frequently relies upon the functions of a dedicated microprocessor to achieve a myriad of word processing and control functions implemented under operator control. Furthermore to assure appropriate operator compatibility, the keyboard input peripheral and the printer employed must closely approximate that to which an operator is accustomed to avoid the market rejection which would occur if an unusual degree of operator retraining was required in the operation of the automatic word processing equipment. Thus, while the keyboard presented to an operator may include a few additional keys whose functions are clearly specialized and associated with specific word processing operations and the like, the actual standard key array presented to an operator must be virtually identical to the standard keyboard array to which the operator is accustomed through long association with conventional typewriter equipments. Similarly, the printer unit must appear to be directly associated with keyboard operations and highly responsive thereto so that the operator is provided with the impression dealing with a conventional typewriter which has been provided with a plurality of automatic features.

Despite such design criteria, the complex nature of the equipments relied upon in automatic word processing equipment capable of achieving the foregoing results, renders development of specialized word processing equipment for each country in which the same is to be sold economically unattractive because in each case, the microprocessor employed would have to be specially dedicated to the requirements of the market country or alternatively, specialized keyboards and printers would have to be developed to synthesize inputs associated with the standards of the country for which the basic design was implemented. Furthermore, such a design approach completely ignores the business fact that many organizations deal on an international level and employ capable personnel having the ability to prepare communications in accordance with the language and format requirements of the nation to which the communication is to be forwarded. Thus, under these circumstances, optimum design criteria for automatic word processing equipment would enable an operator to prepare documents in accordance with the requirements of the destination country as well as those requirements of the native nation so that such automatic word processing equipment could be employed for the preparation of domestic communications as well as international communications.

Therefore, it is a principal object of the instant invention to provide language translating apparatus and methods therefor capable of adapting the operation of an automatic word processing system to meet the requirements and standards of a plurality of nations with only a minor degree of change while imparting a system capability which may be implemented under operator control to cause processing operations to shift from the native requirements for which the system was initially set up to those of a plurality of other countries or language formats.

U.S. Pat. application Ser. No. 622,780 which is entitled Automatic Writing Systems and Methods of Word Processing Therefor, as filed Oct. 15, 1975 in the names of H. Wallace Swanstrom, Kenneth Charles Campbell and Werner Schaer and is assigned to the Xerox Corporation, is directed to a highly advanced form of automatic word processing system which employs independent keyboard and printer peripherals as well as providing word processing operations which are generally unavailable in less advanced forms of processing equipment. Furthermore, while the automatic writing system therein disclosed operates, in the absence of the instant invention, only in accordance with the language and formatting requirements of a particular country, the programmed print outs, schematics and descriptive material filed therewith readily accommodate the instant invention to the degree that the program print outs provide a test for the presence of the instant invention and initialize special subroutines devoted thereto when the same is indicated. Therefore, in order to fully set forth the instant invention without a voluminous amount of textual material as well as to avoid the presentation of extensive amounts of program print out materials which have already been provided in U.S. Pat. application Ser. No. 622,780, supra, the instant invention will be set forth within an environment provided by the automatic writing system and methods of word processing therefor set out in U.S. Pat. application Ser. No. 622,780 supra; whose disclosure is incorporated herein by reference; however, it will be apparent to those of ordinary skill in the art that the concepts, techniques, and modes of implementation of the instant invention are readily applicable to extennd the capability of any system for automatic word processing employing modern data processing techniques.

In accordance with the teachings of the instant invention, language translating apparatus and methods therefor are provided which include a plurality of translator ROMs. The presence of the language translator peripheral is indicated to the word processing system and a small portion of the memory of the peripheral is devoted to the native language corresponding to the market version of the automatic writing system to which the key caps and print font would correspond. When data is entered into the system at the keyboard, the language translator peripheral is active to translate the resulting input codes into recordable system codes to which the automatic writing system as a whole may respond and which represent the alphameric information entered at the keyboard even though the resulting codes may not correspond to that generated at the keyboard. This is done, in effect, through the functions of the language translator peripheral which treats input codes from the keyboard as key position codes and translates the key position codes into character codes corresponding to the characters which reside at those positions for the native country assigned or another elected country which may be defined by the operator. Once such input codes are translated into system compatible media codes, the same may be processed through the system in the normal manner and recorded on a record media. However, when printing is to occur, the system compatible media codes which resulted from the initial actions of the language translator peripheral must again be translated so that appropriate information may be accessed for spoke selection and the like from the printer data ROM or where such information does not reside in the printer data ROM due to the nature of the character defined in a particular language, the language translator ROM must further act to provide appropriate print information to the printer unit to cause the character to be printed. Accordingly, the instant invention provides the automatic writing system disclosed in U.S. Pat. application Ser. No. 622,780, supra, with a high degree of versatility as the same may be rapidly and easily adapted to accommodate operational needs within a plurality of countries while rendering the basic equipment manufactured easily adaptable to international use.

The invention will be more clearly understood by reference to the following detailed description of an exemplary embodiment thereof in conjunction with the accompanying drawings in which:

FIG. 1 is a block diagram schematically illustrating the overall structure of the automatic writing system set forth in U.S. Pat. application Ser. No. 622,780, supra, to which a language translator peripheral employing the concepts of the instant invention has been added;

FIG. 2 is a detailed block diagram schematically illustrating the structure of the language translator peripheral according to the instant invention;

FIGS. 3A - 3L illustrate various exemplary keyboard standard formats for a plurality of exemplary countries or language formats employed within such countries;

FIG. 5 is a chart employed to depict the nature of the alphameric variations at the media-compatible code level for the exemplary keyboards illustrated in FIGS. 3A-3L;

FIGS. 6A - 6D depict various groupings of alphameric characters which are recognized as presenting similarities existing among certain countries and have been employed within the instant invention to reduce ROM requirements;

Figure 4:
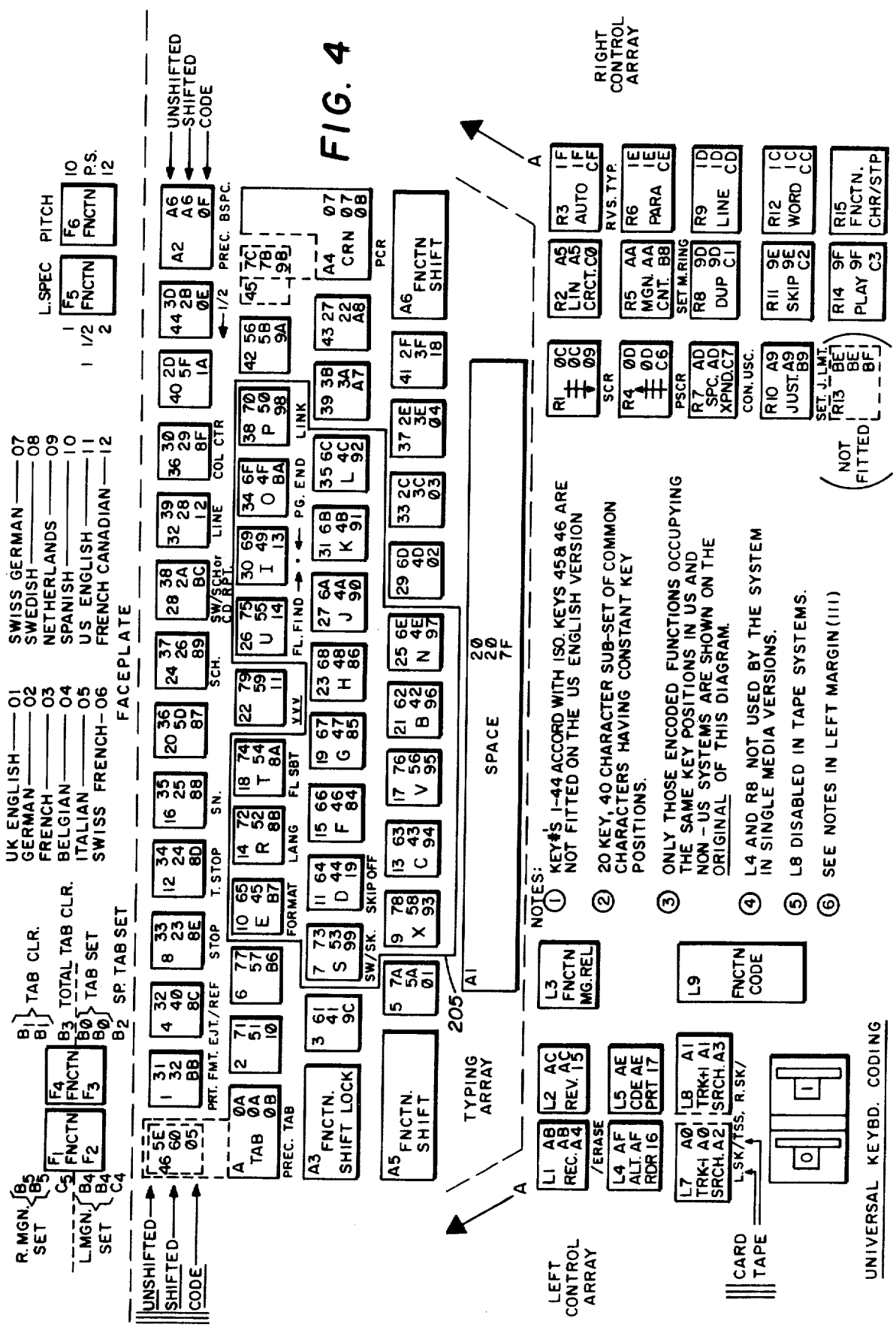
FIG. 4 illustrates a keyboard face plate which may be employed within the automatic writing system employing the language translator peripheral according to the instant invention.
Figure 7:
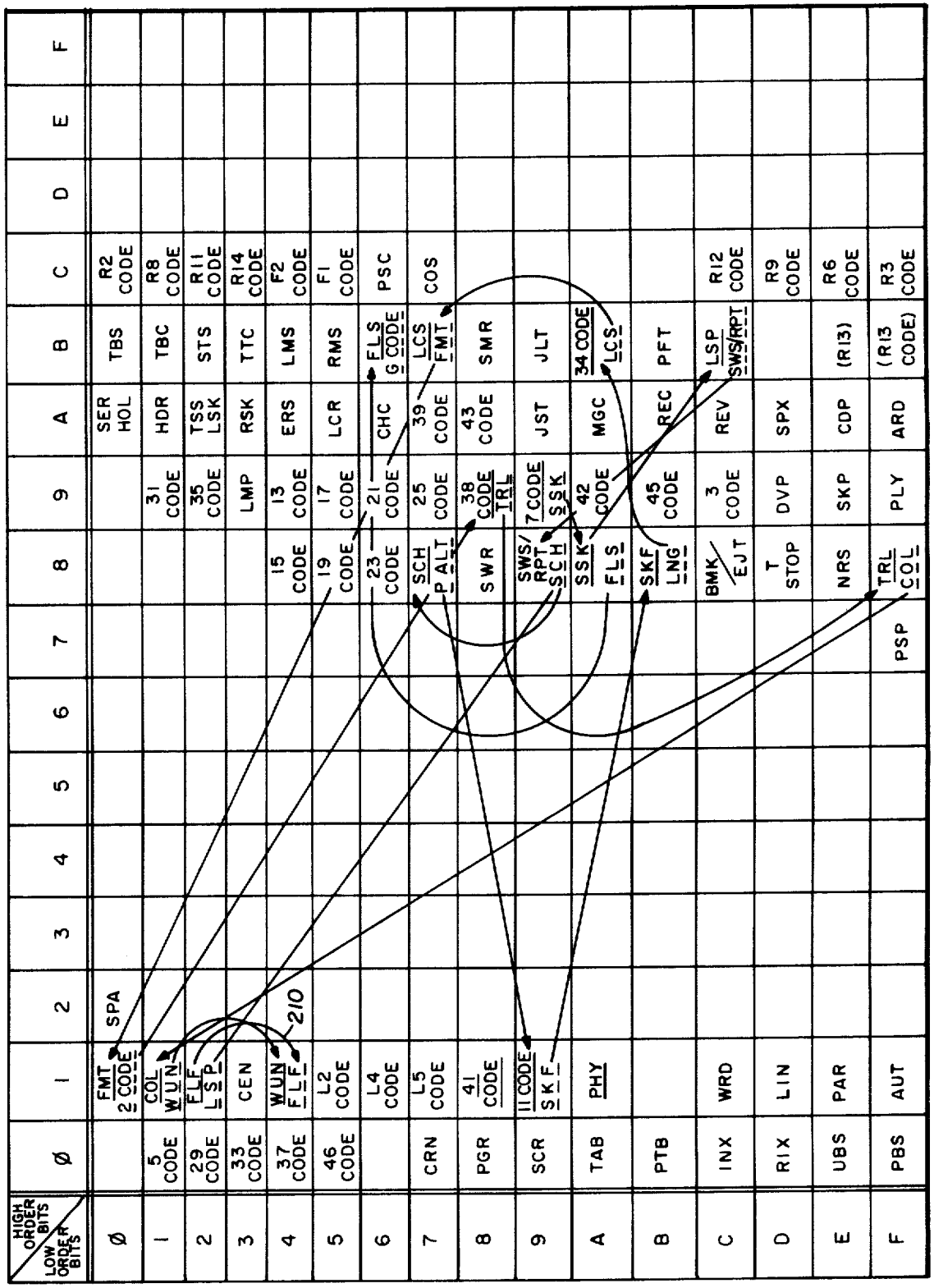
Figure 9A:
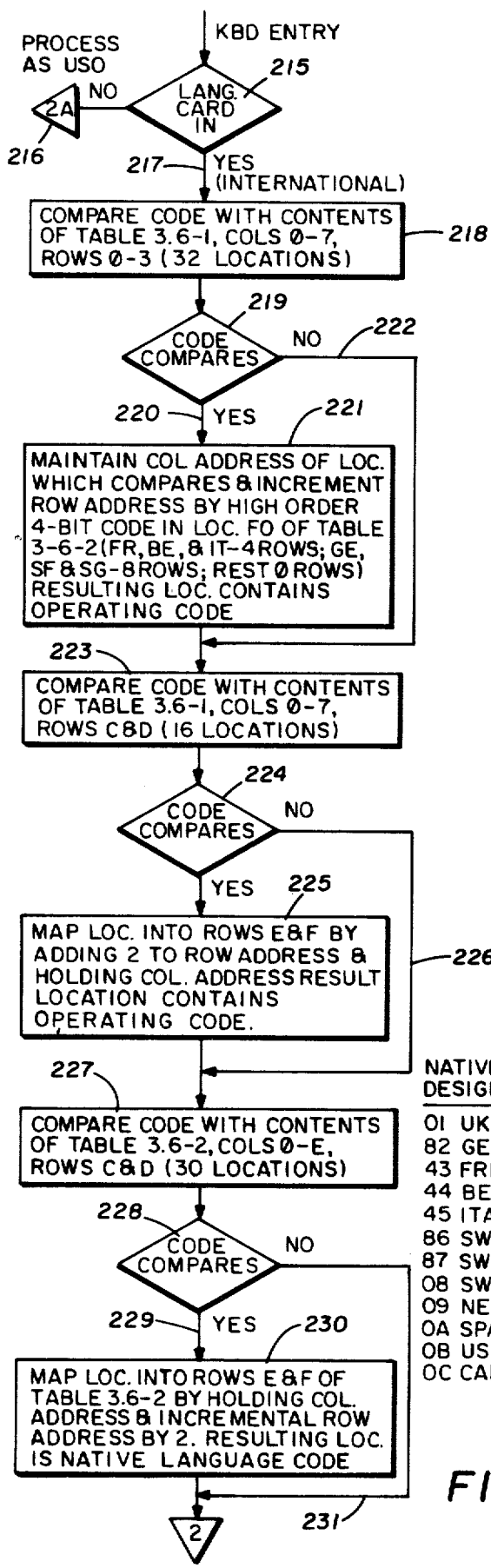
Figure 9B:
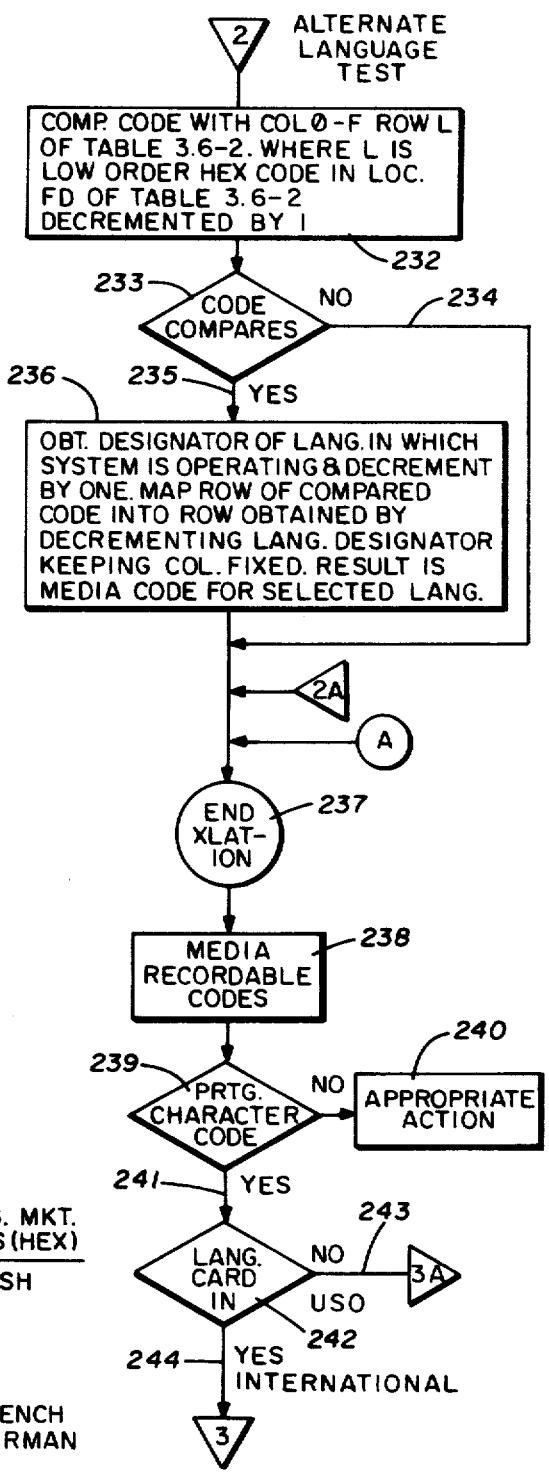
Figure 9C:
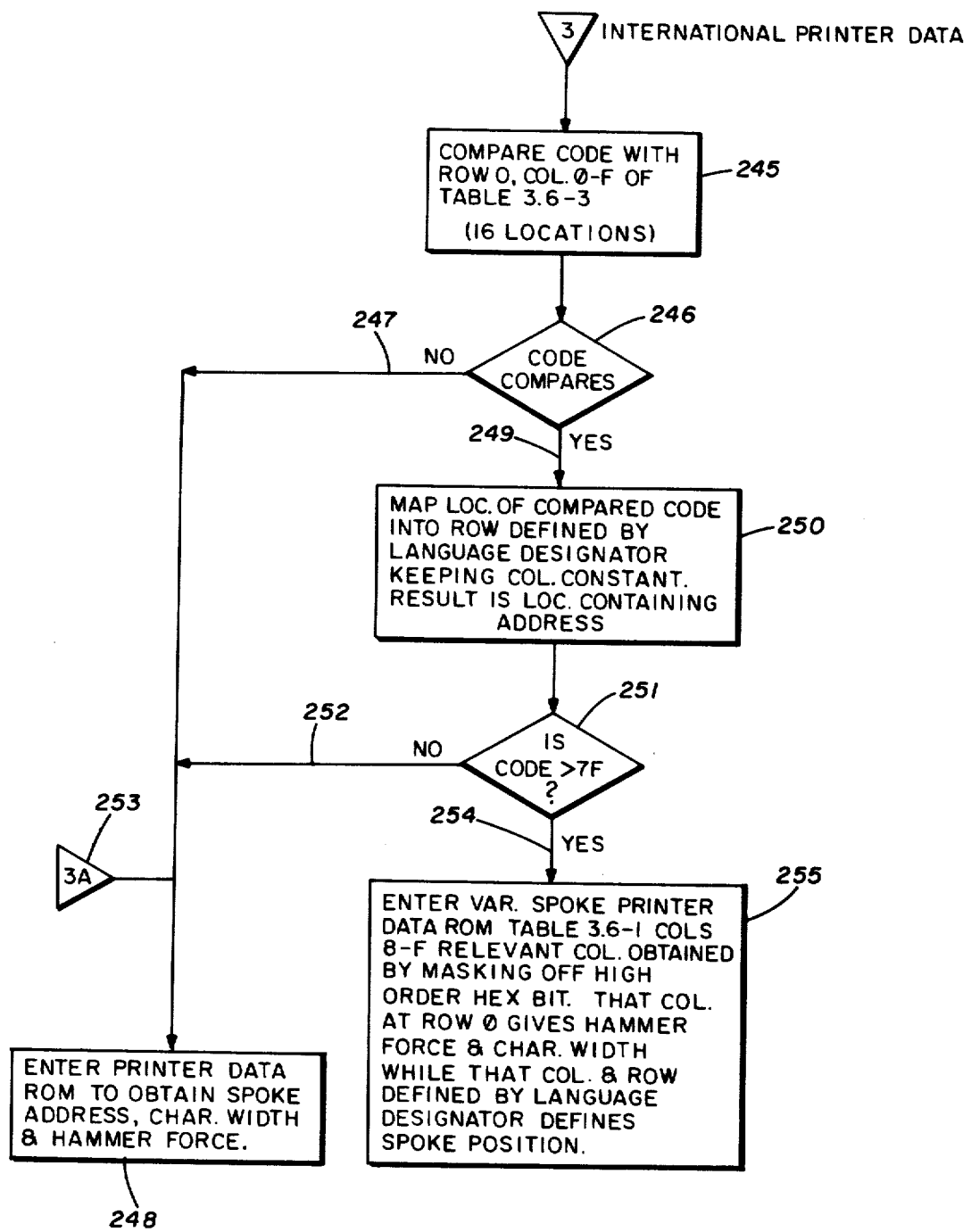

FIG. 7 is a chart showing the variation in placement of encoded functions employed on the international keyboard configuration depicted in FIG. 4 while additionally illustrating the manner in which certain of such encoded functions, whose code varies with that employed in the U.S. version of the automatic writing system set forth, are translated by the instant invention to conform to the codes relied upon within such U.S. embodiment;

Figure 8N:
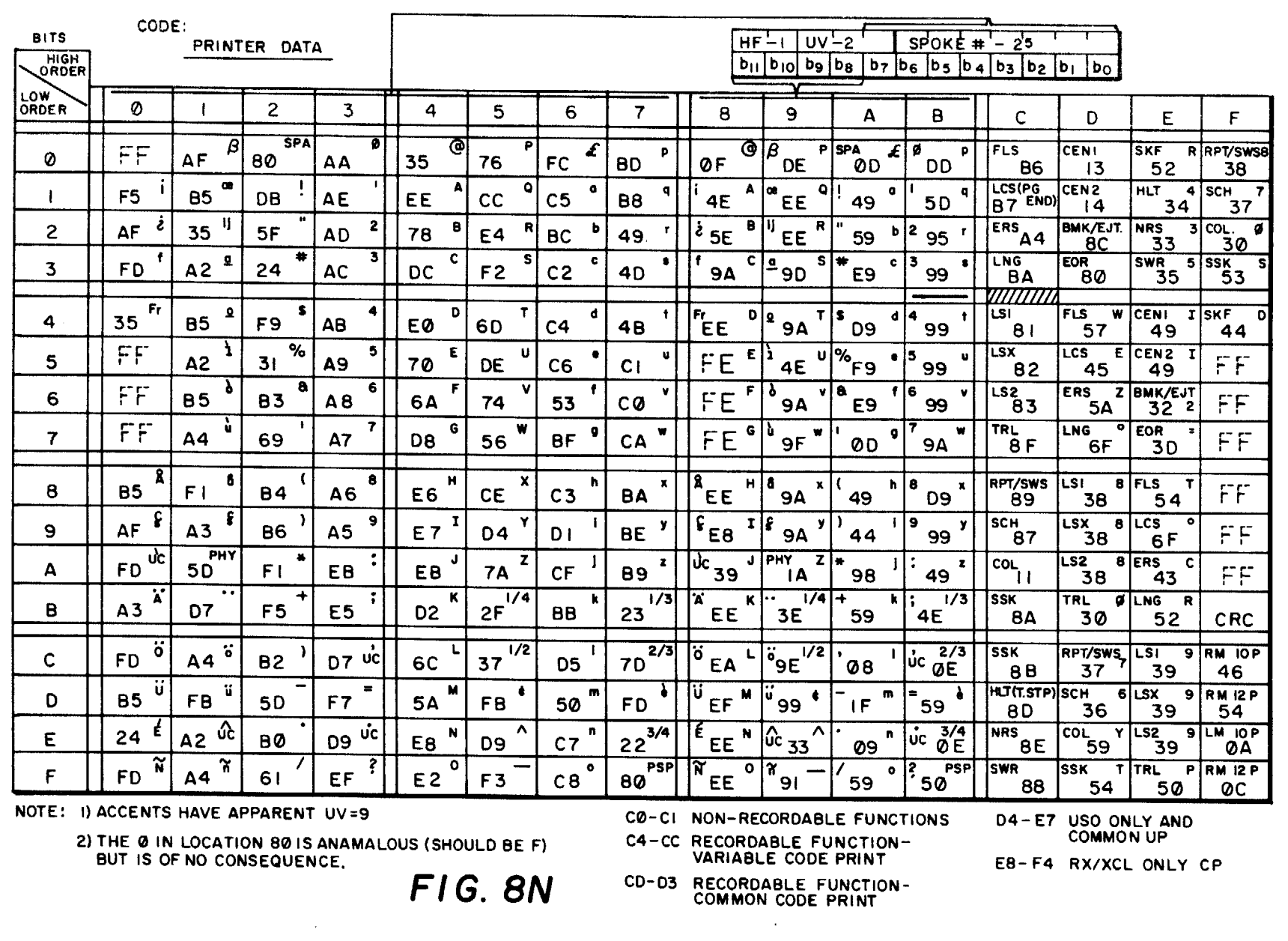

FIGS. 8A - 8N are code charts setting forth the actual code contents of the data ROMs employed within the instant invention; and FIGS. 9A - 9C are flow charts illustrating the manner in which the language translator peripheral according to the instant invention operates under program control.

While the instant invention is set forth according to a preferred embodiment and within a rather specific environment, it will be appreciated by those of ordinary skill in the art that many alternatives and variations in the teachings contained herein may be adopted by those of ordinary skill in the art without deviation from he concepts of the instant invention.

Figure 1:
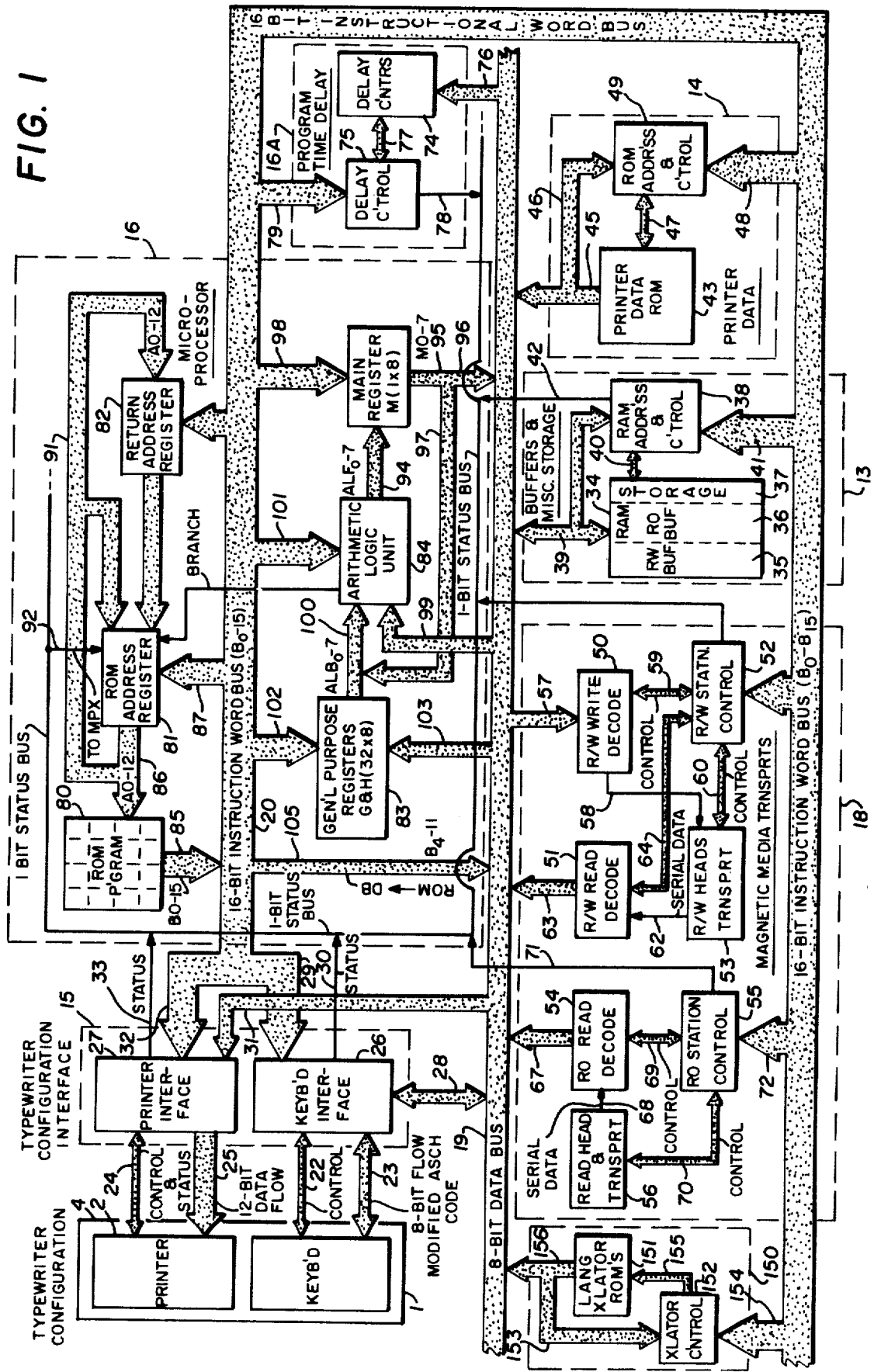

Referring now to FIG. 1, there is illustrated a generalized block diagram of the automatic writing system disclosed in U.S. Pat. application Ser. No. 622,780, supra, to which the language translator peripheral according to the instant invention has been added. More particularly, the portion of FIG. 1 devoted to the automatic writing system disclosed in U.S. Patent application Ser. No. 622,780 includes a microprocessor indicated by the dashed block 16 which is connected to a plurality of peripherals through a common eight bit data bus 19, a sixteen (16) bit instruction word bus 20 and a single bit status bus 21. The peripherals include a keyboard 1 and a printer unit 2 which are each interfaced through interfaces 26 and 27 to the common data bus 19, the common instruction word bus 20 and the common status bus 21. Similarly, a record media peripheral indicated by the dashed block 18 is provided which includes a read/write transport station indicated by blocks 50 - 53 and a read only transport station indicated by blocks 52 - 56 which act, respectively, to record or read or only read lines or character information and thus accept or introduce of character information into the system. The record media transport peripherals indicated by the dashed block 18 are also connected respectively to the common data bus 19, the common instruction word bus 20 and the common status bus 21. Additionally, a buffer and miscellaneous storage peripheral, indicated by the dashed block 13 is present to provide the system with a read/write buffer 35, a read only buffer 36 as well as additional miscellaneous storage 37. Both the buffers 35 and 36 as well as the miscellaneous storage present within the random access memory 34 are connected to the common data bus 19 while the control circuitry therefor is connected to the (16) bit instruction word bus 20 and the common status bus 21. In essence, the purpose of the read/write buffer 35 is to accumulate character information introduced into the system until a line of such character information has been loaded therein whereupon the same may be recorded on a record media loaded at the read/write record media station. Similarly, the read only buffer 36 functions to accept a line of information read from a record media so that the same may be otherwise processed on a per character basis by the system while reading from the active second media transport occurs on a per line basis. The automatic writing system illustrated in FIG. 1 is additionally provided with a printer data ROM peripheral indicated by the dashed block 14 which is only connected to the common data bus 19 and the common instruction word bus 20. The purpose of the printer data ROM 14 is, in essence, to accept eight bit character information or the like from the common data bus 19 and to cause (12) bit print information, (12) bit escapement information and/or (12) bit indexing information to be forwarded to the printer unit 2 through two eight bit passes. The programmed time delay peripheral 16A is additionally provided within the automatic writing system illustrated in FIG. 1. This peripheral, is also connected to the common data bus 19, the (16) bit instruction word bus 20, and the single bit status bus 21; however, as the same merely acts under program control to provide real time delays for processing purposes, it may be treated more properly as part of the microprocessor indicated by the dashed block 16.

The keyboard 1 and the printer unit 2 are provided within an independent housing to present the operator with the appearance of an ordinary typewriter configuration; however, the keyboard 1 and printer unit 2 are completely independent peripherals whose functioning is unrelated except through the action and control imposed by the microprocessor indicated by the dashed block 16. More particularly, the keyboard 1 may comprise a conventional electronic keyboard which acts to generate eight bit ASCII codes upon the depression of individual keys the reon. In the embodiment disclosed in British Provisional Specification Ser. No. 48626/74, a keyboard array having a standard 44 character set as employed within the United States was disclosed; however, as will be appreciated by those of ordinary skill in the art, such a keyboard array may result from a standard 46 character set more generally employed throughout the world wherein two character keys have been masked off. In addition to the standard alphameric character sets, a plurality of additional keys which serve to control processing operations, system functions or system actions are also provided as well as thumbwheels and lever settings to control actions at the printer or the accessing of information at the record media. When the instant invention is employed in conjunction with the automatic writing system illustrated in FIG. 1, a standard 46 character set for alphameric information, as shall be seem more in detail below is employed. In association with the standard set of alphameric keys, which provide, as weill be appreciated by those of ordinary skill in the art, the two conventional code groups associated with lower case and upper case character information as initiated through the depression of the shift or shift lock keys, a third encoded function is employed in association with certain of such alphameric keys and this encoded function is initiated upon the depression of the code key and the alphameric key and results in the generation of a third code group which generally conditions the system for the performance of a specific mode of control.

The printer unit 2 is disclosed in U.S. Patent application Ser. No. 622,780, supra as a daisy wheel printer which receives a plurality of daisy print element wheels each of which may contain a different type font. In essence, in response to twelve bits of print information forwarded from the printer data ROM 43, the printer unit is responsive to produce the appropriate spoke on the print wheel defined by seven bits of such information to displace the ribbon a distance equal to that specified by three bits of such information and to impact the spoke thus positioned with a force defined by two bits of such chracter print information to thereby achieve printing. The daisy wheel print element is mounted on a displaceable daisy wheel print element carriage within the printer and is displaceable in response to (12) bits of displacement information to escape the daisy wheel print element carriage through a defined distance. Similarly, in response to twelve bits of index information, the roller at the printer is incremented so as to displace or index the document being printed from line to line.

The operation of this portion of the automatic writing system occurs as a result of the incrementing by the ROM address register 81 of the read only memory 80 within the microprocessor 16 and the attendant issuance thereby of (16) bit instructions on the (16) instruction word bus 20. The various peripherals are each controlled by instructions issued in this manner on the common instruction word bus 20 while the addressing of the read only memory 80 which contains a fixed program to control the automatic writing system is controlled in response to conditions placed on the common status bus 21 by the various peripherals and various data gated onto the common data bus 19 and loaded into the main register M within the microprocessor 16 for subsequent inspection and classification within the arithmetic logic unit 84. Thus, in a typical print operation where data entered at the keyboard is merely printed at the printer unit 2, the automatic writing system depicted in FIG. 1 when energized, would go through an initialization routine wherein the ROM address register 81 would sequentially increment read only memory 80 to cause (16) bit instructions to be issued in sequence thereby to power up and initialize the system and hence cause the loading of appropriate registers, latches and the like. Thereafter, the microprocessor would enter a monitoring rountine wherein the condition of the various peripherals is monitored on the common status bus on a sequential basis which is continued until something occurs which causes a branch routine to be initiated by the ROM address register 81. In this case, since we are generating input data at the keyboard for subsequent printing, a depression of the key at the keyboard would cause a character ready flag to be generated on the common status bus 21. When this flag is sampled, by the ROM address register 81, a branch routine would be initiated thereby to cause the character ready at the keyboard 1 to be gated onto the common data bus 19 and loaded through the arithmethic logic unit 84 into the main register M. This character would be inspected and classified within the arithmetic logic unit 84 and if it is assumed that a printable character has been loaded, the character would be gated from the main register M onto the common data bus and loaded within the ROM address and control register 49 within the printer data ROM peripheral indicated by the dashed block 14. Once loaded it would cause eight bits of printer data to be read from the printer data ROM 43 and again loaded within the main register M. This would be followed by a second addressing of the printer data ROM 43 to obtain four more bits of significant data to obtain (12) bits of printer character information and these (12) bits would be held in readiness within the general purpose register 83 for subsequent manipulation and forwarding in two eight bit passes from the main register M, through the common data bus 19 to the printer unit 2 which would be responsive thereto to cause a printing of such character information. Additionally, the character originally loaded within the main register M is gated therefrom and stored within the read/write buffer 35 so that the line being entered may be accumulated. However, as recording is not here taking place even when a line of information has been accumulated within the read/write buffer 35, as defined by the entry of a carriage return character, the accumulated line will not be recorded on a record media loaded at the read/write transport. As each character is entered, escapement information corresponding to one-half the distance necessary for character escapement for the character defined, as obtained from three bits or ribbon width information read from the printer data ROM are forwarded to the printer unit prior to the printing of each character as well as one-half the escapement information associated with any previously printed character. At the end of a line being printed, index information as read in the form of a constant from the ROM which is generated as a function of the indexing set at the keyboard is loaded into the main register M and forwarded to the printer 2 so that appropriate indexing at the end of a line of information occurs. Thus it will be appreciated that the microprocessor indicated by the dashed block 16 issues instructions through the common instruction word bus to cause an initializing of the system and thereafter causes instructions to be issued to cause the appropriate processing of information entered into the system as a function of the nature of the information as entered on the common data bus and the pertinent status of individual conditions within the peripherals as sensed on the common status bus 21.

In the foregoing example, if the record key has also been depressed indicating that an operator was desirous of recording information entered at the keyboard, the same functions outlined above would occur in the order mentioned. However, once a line of information had been accumulated within the read/write buffer 35, it would be read therefrom on a per character basis, loaded into the main register M and thereafter conveyed through the common data bus 19 for application to the read/write transport within the record media transports indicated by the dashed block 18. Furthermore, since the action of the random access peripheral 13 and the main register M is much faster than that at which recording may occur, the record media transport is started, the entire line of character information as accumulated within the read/write buffer 35 is recorded and thereafter the record media transport at the read/write station is stopped so that effectively recording has occurred on a per line basis.

In addition to the record mode operations which occur substantially in the manner outlined above, prerecorded record media, representing initial draft materials, previously prepared final copy, or the like, may be selectively loaded at one of the record media stations and read a line at a time into the read only buffer 36 wherein the transfer of each character occurs through the application of such character to the common data bus 19, the loading of such character into the main register M, and the subsequent transfer of such character from the main register M into the read only buffer 36 on a first in first out basis. Thereafter, the transfer of character information from the read only buffer 36 to the main register M may be initiated on a selective basis under program control and each character thus loaded into the main register M may be selectively skipped or alternatively, employed for printing purposes and the accumulation of line information in the read/write buffer 35 in precisely the same manner as if such character information had been entered at the keyboard. Alternatively, prerecorded record media may be loaded at both the read/write and read only record media stations and read on a selected basis into the read only buffer 36 for selective processing in the manner outlined above, so that, in effect, character information located on a plurality of record media may be selectively merged to achieve batched letter operations or the like. Furthermore, any time a playback operation from a prerecorded record media is occurring, a record mode of operation for information entered at the keyboard may also be initiated whereupon the line information which is accumulated within the read/write buffer 35 results from the merger of information entered at the keyboard with character information selectively read from the read only buffer and hence a multitude of editing operations may thus be easily achieved.

Regardless of the mode of entry, each character entered into the main register M from any of the character input sources available is inspected and classified prior to further processing and forwarding to a destination peripheral defined by the operation then occurring. This means, that a great many editing, revision, and data manipulations may be automatically performed by the word processing system disclosed since the automatic writing system set forth may act upon the definition of one of a plurality of modes to determine the nature of the character loaded in the main register M and cause appropriate processing to occur in accordance therewith. For instance, the playback of character information from a prerecorded record media may be simply and easily achieved on a character, word, line, paragraph or automatic basis since each grammatical grouping is terminated by character information defining such grouping. Thus for instance, each eight bits of information loaded into the main register M defines a character and hence should the character action key be depressed, a single character is read from the read only buffer 36, loaded into the main register M, and further processed in the manner defined at the keyboard and thereafter such processing is automatically terminated by the automatic writing system until a new action key is again depressed; it being that the processing in response to the depression of an action key may selectively cause printing to occur at the printer unit and the forwarding of this character to the read/write buffer 35, mere loading of the character in the read/write buffer 35 for the accumulation of new line information without printing or alternatively a skip mode of operation may be selected wherein the character loaded into the main register M is effectively skipped as no further processing occurs. Similarly, a word grouping of character information may be defined by a space code or the like following a grouping of alphameric character information and hence this mode of processing by the main register M may occur in the manner set forth for a character grouping except in this case, the main register M compares each character loaded therein with a constant representing a space code of causes automatic processing a terminate upon the detection of such space code. Similarly, lines may be defined by carriage return characters or the like, paragraphs may be defined by pairs of carriage return characters or carriage return characters followed by a tab, while an automatic mode of processing may be determined by desirable stopping points such as a page of information which may be correspond to a block of information on the record media.

Furthermore, as the microprocessor indicated by the dashed block 16 maintains current information regarding the position of the printer as well as information defining all margins and tabs set at the keyboard, many automatic format modes of operation may be achieved under program control. Thus, when information is entered at the keyboard, a manual mode of margin control or automatic carriage return operation may be defined at the keyboard which causes automatic processing to be varied in such manner that any time the margin zone defined at the right hand portion of the document is entered by the printer, the automatic writing system substitutes a carriage return character for the first space code or hyphen entered into the main register M to automatically cause a carriage return operation and indexing to occur at the printer without the need for operator intervention. When keyboard entry of information is considered, automatic formatting modes tend to be somewhat limited because the inspection and classification routines conducted for character information entered into the main register M are limited to single character inspections associated with individual characters entered at the keyboard. However, when dealing with playback modes of operation where an entire line is read from a prerecorded record media and loaded into the read only buffer 36, no such limitations are present, since the microprocessor, acting under program control, may effectively inspect the contents of an entire line through inspection routines of individual characters in sequence within the main register M. The availability of this mode of inspection of character information, effectively acts to open unlimited horizons regarding the formatting, editing and atomatic control procedures which may be performed by the automatic writing system since a multitude of selectable operating routines may be provided. For instance, advanced forms of margin control or even justifying operations may be achieved since open entry of the printer into a print position associated with the right hand margin, the automatic writing system may scan forward to ascertain whether a character code, such as a space code is available for the substitution of a carriage return character and if the same is available, automatic processing may be continued while if the same is not the look ahead review conducted effectively provides the operator with the full width of the margin zone established to perform a hyphenation procedure. Similarly, for justification operations, the automatic writing system may scan the line of accumulated character informaton loaded into the read only buffer to ascertain whether or not a carriage return point is available within the justification limits imposed so that interword spaces may be lengthened in an appropriate degree to cause the carriage return operation to occur at a fixed column position. If the same is available, the line is automatically printed with the interword space codes suitably modified in length to cause the line to end at a fixed column position while if the same is unavailable, operator intervention is called for prior to any printing of the line of information being scanned so that the operator is provided with a full ambit of alternatives.

This mode of line review is also extendable to the re-formatting of draft materials entered with appropriate instructions therefor during record mode operations For instance, a great number of operations which imposed fatiguing repetitiveness on an operator may be automatically achieved merely by the entry of an appropriate code during the record mode of operation and although the automatic writing system is unresponsive to such code when initially entered, the same will cause an automatic operation to occur upon the detection of the code during a playback mode of operation when the line of data associated therewith is present in the read only buffer 36 and hence available for review by the microprocessor. Thus, a centering code may be entered during the drafting of a document followed by material on the line to be centered. During keyboard entry, automatic processing of this code may not occur since the material to be centered is unavailable; however, during automatic playback operations, upon a detection and classification of such centering code, the automatic writing system reviews the following material on the line and centers the same during printing between the right and left margins. Similarly, automatic formatting of statistical data may be achieved under program control during playback operations in such manner that during data entry, the operator merely defines columns and enters statistical data flush to the left hand portion of the column defined. During subsequent playback operations, the automatic writing system acts to identify the presence of columns and statistical data and thereafter operates to cause printing of such statistical data flush to the right hand portion of such column even though entry by the operator occurred flush to the left hand portion. Although the foregoing options available in automatic writing systems of the type set forming FIG. 1 are exemplary of operations which may occur, they suffice to illustrate the advantages available with current state of the art word processing equipments and hence the manner in which such equipments cause automatic underscoring to occur, control the number of lines printed per page, cause automatic accessing of the first line of a page to be printed as well as causing automatic switching between record media being played back where the switching may occur for play or skip modes is readily understandable. Furthermore, similar techniques may be employed for searching the prerecorded record media so that information recorded thereon may be quickly accessed and automatically processed in the manner defined by information recorded on the record media or aternatively in the manner implemented by an operator at the keyboard.

The brief description of the portion of the automatic writing system illustrated in FIG. 1 which has been set forth above is sufficient to cause those of ordinary skill in the art to appreciate that virtually all of the automatic word processing features which are achieved in current state of the art word processing systems are implemented through an inspection, identification and manipulation of character information being processed in the system under the control of the microprocessor indicated by the dashed block 16. Furthermore, the manner in which such editing operations, data manipulations and processing operations occur result as a function of control or action information defining desired modes of operation which are entered by the operator at the keyboard and hence it will be apparent that essentially all word processing operations conducted depend on the nature of the data identified and the control modes of operation defined for the system at the keyboard. This means, that the microprocessor indicated by the dashed block 16 must be in a position to classify, identify, and respond upon appropriate identification to character information loaded into the main register M regardless of the source of such character entry because if such system codes as are introduced and processed are not identifiable, the microprocessor indicated by the dashed block 16 could not function to either identify the control mode of operation defined nor could it act to identify appropriate character codes for which a predetermined control mode is to be initiated. Similarly, since the actions of the printer 2 associated with the printing of character information are controlled by the (12) bit print code information forwarded by the printer data ROM 43 under conditions where only seven bits of the (12) bit character forwarded define character print spoke information while the remaining five bits are employed for ribbon displacement and hammer force, it will be seen that the print information forwarded to the printer unit 2 must act to uniquely define the position of each character spoke of the print wheel loaded thereon so that precise and absolute definition of the character to be printed may be supplied to the printer 2.

Although character information generated at the keyboard takes the form of eight bit ASCH code groups which are conveyed through the eight bit common data bus 19 into the system, the code assignments employed within the automatic writing system depicted in FIG. 1 are such that the eighth bit position thereof is reserved to indicate the delineated status of the alphameric character defined by the remainder of the code. Thus, in effect, the generation of codes for alphameric printing characters at the keyboard occurs on the basis of a seven bit code, in much the same manner as printer information, while the condition of the eighth bit is reserved to indicate whether or not such character is delineated, said eighth bit being in a Zero condition to represent a non-delineated status and in a One condition to represent a delineated status. Thus, both alphameric information and print spoke information are represented by seven bit codes within the automatic writing system illustrated in FIG. 1, while the remaining eight bit codes available, i.e., those not associated with alphameric character information, are reserved to define the various function codes or control codes entered at the keyboard.

In view of this coding scheme and the rather universal use of standard key sets containing 44 or 46 characters and the resulting 88 or 92 unique alphameric printing codes associated therewith, it will be appreciated by those of ordinary skill in the art that the design conditions imposed on the system are such that only one or at most, a few language standards are available for direct coding within the system as a greater number of languages would exceed available code assignments within the system. For instance, each 44 or 46 standard character key set would impose a requirement for 88 or 92 unique character codes while code availability for printing characters associated with encoded functions or spacing commands such as tab and carriage return must be retained. Hence, despite the exceedingly advanced nature of the automatic writing system disclosed in U.S. Pat. application Ser. No. 622,780 supra, the system is limited to the recognition, classification and identification of a rather limited set of language standard formats which is wholly insufficient to accommodate truly international versions of the automatic writing system wherein new key caps and daisy wheel print elements would need only be supplied to define market country versions of the same basic machine.

This limitation is alleviated by the language translator apparatus and methods therefor set forth in conjunction with the instant invention. More particularly, as is also illustrated in FIG 1, the instant invention adds a peripheral, indicated by the dashed block 150 which performs three distinct translating functions within the automatic writing system depicted in FIG. 1 to accommodate the resulting apparatus to international requirements. Therefore, the automatic writing system illustrated in FIG. 1 including the language translating peripheral indicated by the dashed block 150 may be provided to meet the language requirement of any of a plurality of market countries in a simple and inexpensive manner while the same enhances the capabilities of the resulting apparatus so that it may perform not only in accordance with the requirements of the native market country, but in addition thereto is responsive to operator selection of additional language requirements to perform in accordance with the language of a defned country merely by the entry of appropriate codes at the keyboard and the changing of the daisy wheel print element at the printer unit 2 to one associated with the language requirements of the language market version selected by the operator at the keyboard. Thus in essence, with the addtion of the language translator peripheral indicated by the dashed block 150, the basic automatic writing system disclosed in U.S. Patent application Ser. No. 623,780 supra and programmed in the precise manner specified therein may be adapted for universal application merely by providing new key caps appropriate to the market language selected together with corresponding print wheels for the daisy wheel print element printer unit 2. Furthermore, multi-national or language marketing feasibility is enhanced because, as shall be seen below, the basic language translator peripheral employed is the same for all market versions in that only the contents of one of the three read only memories provided therein must be specially adapted to the market version selected.

The language translator peripheral indicated by the dashed block 150 comprises as indicated therein a plurality of language translator ROMs 151 and translator control apparatus indicated by the block 152. Although the structure and detailed modes of operation of the language translator peripheral indicated by the dashed block 150 will be set forth in great detail in conjunction with succeeding figures, the generalized structure and functions performed thereby will here be briefly disclosed to acquaint the reader with the overall operation of this peripheral within the automatic writing system depicted in FIG. 1. The initial function of the language translator peripheral indicated by the dashed block 150 is to cause character codes inputted from the keyboard unit 1 to the main register M to be treated as keyboard position codes regardless of language and cause the keyboard position code thus received to be translated into an appropriate media code associated with either the native language or the language selected which media or system code is intelligible to the microprocessor indicated by the dashed block 16 and may be recorded on the record media for storage purposes. This occurs through a three stage translating operation, where in essence, during each translating step, the code inserted from the keyboard into the main register M is compared with codes stored within the language translator ROMs indicated by the block 150 and if a comparison results, a new code which may not be unique to the character associated therewith is input into the system as an intelligible media code for processing. For each of the three translations which occur in the translation of keyboard positon codes to media codes, address information associated with the code and language is supplied to the translator control apparatus 152 from the common data bus 19 through the multibit conductor 153 while control information as well as appropriate information for the selecting of an appropriate one of the translator ROMs is supplied through a decode of 5 ROM bits $B_0 - B_{15}$ supplied to the translator control apparatus 152 from the common instruction word bus 20 through the multibit conductor 154. Through the information thus received at the translator control apparatus 152, appropriate ones of the language translator ROMs 151 are addressed and eight bit codes present in the eight bit storage locations therein are read therefrom and applied through conductor 156 to the common status bus for loading into the main register M. Thereafter, the keyboard position input character is compared therewith in the arithmetic logic unit 84 and this operation is continued through the incrementing of the address supplied to the language translator ROMs until either a comparison results or the contents of the table are exhausted. If no comparison results, upon exhaustion of all three tables, a determination that no translation is required occurs and the keyboard input code is treated by the system as a media code. However, if a comparison results, the translator ROMs are addressed to a location designated by the resulting comparison whereupon an intermediate or final media code results depending upon the stage in the three requisite translations which have occurred. Once a media code is obtained, such media code is employed for all processing operations except that associated with the addressing the printer data ROM and hence the attendant issuance of print information to the printer unit 2.

For printing operations, the resulting media code may have to undergo further translation to obtain either an address which is applicable to the printer data ROM for accessing unique spoke information associated with the selected language to cause printing at the printer unit or if the nature of the resulting code requires, the language translator peripheral per se is addressed in two passes to obtain twelve bit printer character information which is forwarded to the main register M and subsequently to the printer to thus achieve appropriate character printing. The addressing of the language translator ROMs in the comparison operations associated with a determination as to whether or not the media code requires translation to an address for the printer data ROM or the language translator peripheral per se is accomplished in the same manner above wherein row and column information is forwarded thereto through the common data bus while the ROM selected is defined and enabled through a decoding of ROM bits issued through the common instruction word bus. Comparison operations are again handled by the arithmetic logic unit 84 within the microprocessor and if a comparison operation results, an address location within the language translator ROMs is defined and an address is read therefrom. If the address meets certain criteria, as shall be seen below, the printer data ROM is addressed directly from the main register M whereupon normal printing routines within the automatic writing system may resume. However, if the address accessed from the language translator ROM exceeds a predetermined value, this address is modified and employed to address the language translator ROM per se whereupon (12) bit printer information is read from the language translator ROMs and applied to the eight bit common data bus in two passes for subsequent forwarding and use at the printer unit 2.

Accordingly, it will be appreciated by those of ordinary skill in the art that the employment of the language translating peripheral according to the instant invention enables a properly programmed word processing system which has been designed in accordance with the standard language requirements of one country to be readily and easily adapted to meet the language standards of another country by merely adding the peripheral according to the instant invention, providing the keyboard with appropriate key caps in accordance with the standards of the native market version selected and providing corresponding print wheels for the printer unit 2 per se. Additionally, as shall be further seen hereinafter, the use of the instant invention allows the resulting automatic writing system to operate according to language standards of other countries not limited to the domestic requirements of the native language market version by the operator's selection of such other countries requirements through an inputting at the keyboard of the language encoded function together with the code numerals associated with the selected country and a mounting of an appropriate daisy wheel print element at the printer unit 2.

The details of the language translator peripheral according to the instant invention are set forth in greater detail below.

Referring now to FIG. 2 there is shown a detailed block diagram schematically illustrating the structure of the language translator peripheral according to the instant invention. The exemplary structure for the language translator peripheral illustrated in FIG. 2 comprises language translator ROMs 160 - 162, an output gating arrangement 163 and address latch means 164 - 166. Each of the language translator ROMs 160 - 162 may take the conventional form of pre-programmed read only memory devices having addressable storage therein for 256 eight bit words. As such, each of the three language translator ROMs 160 - 162 may be formed by a pair of conventional 3601 ROM devices having 1,024 bits of storage therein. Each pair would be connected so as to be commonly addressed and hence would provide four bits of each of the 256 eight bit storage locations associated with each of the language translator ROMs 160 - 162. Each of the language translator ROMs 160 - 162 is provided with an enable input as indicated in FIG. 2, is addressed by eight bits in parallel as indicated as $A_0 - A_7$ and when enabled each of the ROMs will read out the contents of the address storage locations therein as eight parallel outputs $O_0 - O_7$ on output cables 167 - 169. The contents of each of the language translator ROMs 160 - 162 are discussed in detail in conjunction with FIGS. 8A - 8M and hence at this portion of the instant disclosure it is sufficient to merely understand the nature of the contents contained therein. Thus as indicated in FIG. 2, the language translator ROM 160 contains keyboard input translator information as does one-half of the language translator ROM 161 and this information is employed to achieve any necessary conversion of keyboard input position codes to appropriate system or media codes which the automatic writing system requires to achieve automatic processing. Furthermore, it should additionally be noted that only the portion of the keyboard input information present in language translator ROM 160 is specifically associated to the market version for which the automatic writing system is designed and hence only the two chips associated therewith need be changed to accommodate particular market versions while the remaining chips employed in FIG. 2 are common to all market versions.

The second half of the language translator ROM 161, as indicated in FIG. 2, contains information associated with variable spoke printer data and hence, it will be recalled from the description of FIG. 1 that whenever a media code to printer address code translation is such that it can not be employed to address the printer data ROM specifically, appropriate character information must be provided by the language translator peripheral per se. This information is contained within the second half of the language translator ROM 161 and is read therefrom in two eight (8) bit passes. It should additionally be noted that whether the upper half of the language translator ROM 161 which contains keyboard input translator information or the lower half of the language ROM 161 which contains variable spoke printer data is addressed is controlled by the condition of address bit A7; hence, although, as shall be seen below, all three of the language translator ROMs 160 – 162 are normally addressed in parallel, address bit A7 for the language translator ROM 161 is removed from the parallel addressing and is separately applied through a gating arrangement. The third language translator ROM 162 contains address information employed in the translation of media codes to printer data address codes and is employed for comparison purposes each time character print information is to be supplied to the printer unit 2. If the output of the language translator ROM 162, as shall be seen below, exceeds a specified value, the address read therefrom may not be employed to directly address the printer data ROM 43 and hence this address is modified and employed as an address for the variable spoke printer data contained in the language translator ROM 161.

Accordingly, it will be appreciated that whenever one of the language translator ROMs 160 – 162 is addressed and enabled, the eight bits contained within the address storage location therein are read out and applied through one of the multiconductor cables 167 – 169 to the input of the output gating array 163. The output gating array may be conventionally formed by eight AND gates each of which is commonly enabled and has the remaining input thereto connected to a corresponding one of outputs $O_0 - O_7$ of the language translator peripherals 160 – 162. The outputs of the output gating array 163 are connected, as indicated in FIG. 2, to individual conductors within the cable 156 (FIG. 1) so that the eight bits of information applied thereto when the output gating array 163 is enabled may be conveyed through the common data bus 19 to the main register M. The enable input to the output gating array 163 is connected through conductor 170 to the output of an AND gate 171. The output of the AND gate 171 will go high when both of the inputs thereto are high in the conventional manner. It further should be noted that whenever the output of AND gate 171 goes high to enable the output gating array 163 to gate eight bit data onto the common data bus, an enable level is also applied to conductor 172 which, as indicated in FIG. 2, provides an enable level to the main register M so that such data may be loaded thereinto. One input to the AND gate 171 is connected to a terminal $B_5$ which represents the condition of ROM bit $B_5$ as read from the read only memory 80 during each instruction cycle and is applied to the language translator peripheral indicated by the dashed block 150 in FIG. 1 through the multiconductor cable 154. The second input to AND gate 171 is connected through conductor 173 to the output of an AND gate 174. This AND gate acts to decode all instructions issued by the read only memory 80 which are directed to the language translator peripheral as indicated by the terminal annotated Basic XLATOR Decode. The output of the AND gate 174 thus will go high during the interval in the eight phase instruction cycle which is associated with clock cycles CB and CC being low corresponding to the last three subphases of each instruction cycle wherein an instruction cycle has eight subphases formed by four (4) phases of the system clock (not shown). The basic translator decode indicated in FIG. 2, corresponds to a decoding of ROM bits $B_{15} - B_6$ in each instruction cycle under such conditions that ROM bits $B_{15}$, $B_{14}$, $B_{11} - B_9$, $B_7$ and $B_6$ are in a Zero condition while ROM bits $B_{13}$, $B_{12}$ and $B_8$ are in a One condition. This decode may be achieved through an AND gate decoding of the appropriate bits within each instruction applied to the language translator peripheral through conductor 154. Accordingly, the output of AND gate 174 goes high during the last three clock subphases of any instruction cycle wherein an instruction devoted to the language translator peripheral has been issued and an enable level will be applied to conductor 172 to enable the output gating array 163 as well as the main register M whenever that instruction contains ROM bit $B_5$ in a One condition.

As aforesaid, each of the language translator ROMs 160 - 162 is addressed in parallel and as indicated in FIG. 1, the address information initially supplied thereto is provided through the common data bus 19. More particularly, the address latch means 164 and 165 when appropriately enabled receives four bits of address information from the common data bus in a two pass input operation and once the information is latched therein these bits are applied in parallel to the language translator ROMs 160 – 162 with the exception of address bit 7 associated with language translator ROM 161 as aforesaid. All of the address latch means 164 – 166 may take the conventional form of SN7475 four bit latches as conventionally available from the Texas Instruments Corporation. These devices act in the well known manner to latch a four bit input supplied thereto at inputs $D_1 - D_4$ thereof when the enable thereto is high and from that point on will reflect the latched inputs at outputs $Q_1 - Q_4$ until new information is established therein. The address latch means 164, as indicated in FIG. 2, receives row select information associated with a given language from the common data bus and provides this address in parallel to each of the language translator ROMs 160 – 162 through the multiconductor cables 175 – 178 which may be viewed as comprising four parallel bit conductors. These four bits are supplied to the row select latch 164 through the multiconductor cable 179 which connects directly to the common data bus 19 and acts to supply the four low order bits to the row select latch 164. The enable level to the row select latch 164 is supplied through conductor 180 from the output of AND gate 181. The output of AND gate 181 will go high to enable the row select latch 164 to load data from the multiconductor cable 179 whenever ROM bit $B_4$ is a One in an instruction which causes the output of AND gate 174 to go high. This instruction, as listed in the Operand List appended hereto as Appendix A and U.S. Patent application Ser. No. 622,780, supra, corresponds to an ALIN Operand directing the input of language information to the row select latch 164. When this instruction occurs, a four bit code representing the language is applied through the multiconductor cable 179 and loaded into the row select latch 164. Thereafter, this four bit row defining portion of the address is applied through cables 175–178 to each of the language translator ROMs 160 – 162.

The column select latch 165 also receives four bits of information to be latched from the common data bus 19 through multiconductor cables 182 and 179. In this case, the enable supplied to the column select latch 165 is supplied through conductor 183 from the output of AND gate 184. The output of AND gate 184 will go high to enable the column select latch 165, as indicated in FIG. 2, whenever an instruction has issued causing the output of AND gate 174 to go high in an instruction which contain ROM bit $B_3$ in a One state. These instructions, corresponding to Operands AKIN, APIN, and AMIN, as set forth in the Operand List attached hereto; thus enable the column select latch 165 to latch four bits of column select information supplied through the low order four bit conductors within the common data bus. The output of the column select latch 165 is supplied through cables 185 – 188 in parallel to each of the language translator ROMs 160 – 162 it being noted that cable 187 is only a three bit conductor cable, as indicated, wherein address bit $A_7$ has been effectively stripped off so that the selection of the upper or lower half of the storage locations contained within the language translator peripheral 161 may be separately controlled through the output of OR gate 189 which is directly connected to the A7 input through conductor 190. This is here necessary, as shall be seen below so that selection information regarding the keyboard input translating information or the variable spoke printer data may be supplied as a function of both the output of the column select latch 165 and the remaining address latch means 166. In this regard it may be noted that the Q4 output is additionally supplied through conductor 191 to one input of OR gate 189 so that whenever four bits of address information have been latched within the column select latch 165 having data bit $D_4$ in a One condition, this condition will be reflected at the A7 output to the language translator ROM 161. Accordingly, it will be appreciated by those of ordinary skill in the art that address information is latched into the row and column select latches 164 and 165 in two passes under the control of instructions issued by the read only memory 80 and thereafter such address information is supplied to each of the language translator peripherals 160 – 162 so that the address location within an enabled one of said language translator peripherals is applied to the output gating array 163.

The manner in which a selected one of the language translator ROMs 160 – 162 is enabled is governed by the remaining address latch means 166 which is appropriately annotated as the ROM select latch 166. This latch is enabled by the output of AND gate 184 which, it will be recalled, acts to enable the column select latch 165; it being appreciated that in normal processing modes of operation, language information would be normally loaded into the row select latch 164 in a first instruction cycle and followed by the addition of column select information into the column select latch 165 whereupon a full address will have been loaded and applied to each of the language translator ROMs 160 – 163 and hence the enabling of a selected ROM is appropriate. Furthermore, as shall be seen hereinafter, comparison operations with information read from the ROM are frequently compared by specifying a given row and thereafter reading out each column position and under these conditions, the language/row designation latched into the row select latch 165 could remain fixed for a given interval while the address present in the column select latch 165 is incremented sequentially through the various instruction cycles seeking to read out the codes to be compared. The data inputs to the ROM select latch 166 as annotated $D_1$–$D_4$ in FIG. 2 are supplied from both the common data bus 19 and the sixteen (16) bit instruction word bus 20. More particularly, the condition of data bit $DB_4$ is applied at the appropriately annotated terminal to the D1 input of the ROM select latch 166 while the remaining inputs thereto derive from the common instruction word bus 20. Accordingly, the condition of ROM bit $B_0$ is applied to the D2 input, the condition of ROM bit $B_2$ is applied to the D3 input while the complement of the condition of ROM bit $B_1$ is applied to the D4 input of the ROM select latch 166. These inputs to the ROM select latch 166, as shall be apparent to those of ordinary skill in the art, define the translation function which is to occur and hence, the language translator ROM 160 – 162 which is to be enabled. The outputs of the ROM select latch 166 as provided at outputs annotated Q1, $Q_1$, $Q_3$ and $Q_4$ are connected through conductors 192 – 196 to cause the selective enabling of the language translator ROMs 160 – 162. More particularly, it will be appreciated that the $Q_1$ output on conductor 192 and the $Q_2$ output on conductor 194 are NANDed by NAND gate 197 to produce a low or enabling level on conductor 198 for the keyboard input translator ROM 160 only when both of the $Q_1$ and $Q_2$ outputs of the ROM select latch 166 are low. Similarly, the $Q_1$ and $Q_2$ outputs of the ROM select latch 166, as applied through conductors 193 and 194 to an AND gate 199, will produce a high or enabling level on conductor 200 for subsequent inversion and enabling of the language translator ROM 161. This occurs, as will be appreciated by those of ordinary skill in the art as the output of AND gate 199 is applied through conductor 200 to the input of a NOR gate 201 whose output is in turn applied through conductor 202 to the enable input of the language translator ROM 161. Therefore, as the output of NOR gate 201 will go low any time a high level input is applied thereto to thus produce an enabling level, it will be appreciated by those of ordinary skill in the art that the Q1 and Q2 outputs of ROM select latch 166 act conjointly to enable the language translator ROM 161 when both of these outputs are in a high condition. A second input to the NAND gate 201 is applied directly from output $Q_3$ of the ROM select latch 166 through conductor 195. Thus, when this output of the ROM select latch 166 goes high, the output of NOR gate 201 also goes low to enable the language translator ROM 161. It will be appreciated by those of ordinary skill in the art that two sets of input conditions for an enabling of the language translator ROM 161 are here effectively ORed by the action of NOR 201 due to the fact that the language translator ROM 161 is a shared memory which must be enabled both for keyboard position code to media translation and for media code to variable spoke printer data translations. Similarly, the Q3 output of the ROM select latch 166 is applied through conductor 203 to a second input of OR gate 189 whose output, on conductor 190, controls the condition of address bit $A_7$ and hence whether or not the high order or low order half of the language translator ROM is addressed. Thus, the joint action of the column select latch 165 and the ROM select latch 166 is here also employed to generate the condition of address bit A7 so that the appropriate half of the language translator ROM 161 may be selecged for keyboard to media code translations or media code to variable spoke printer data translations. The Q4 output of the ROM select latch 166 is applied through conductor 196 to directly enable the media to printer data ROM 162. However, as it will be recalled by those of ordinary skill in the art that low levels on the enable inputs to the language translator ROMs 160 - 162 are required to achieve the enabling function, it will be seen that a Zero (0) condition at the Q4 output of the ROM select latch 166 is the appropriate enabling condition for the media to printer data ROM 162.

Figure 3A:
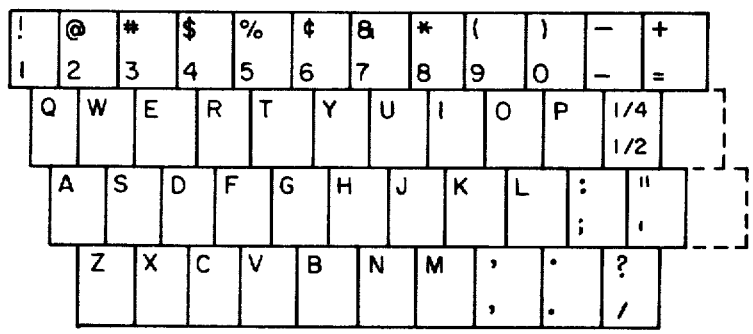
Figure 3B:
Figure 3C:
Figure 3D:
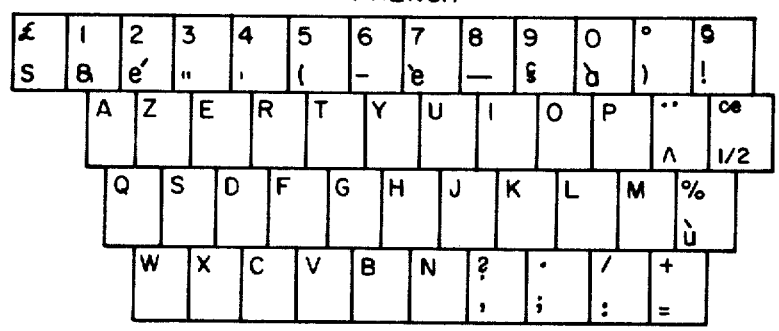

Although additional generalized circuit considerations for the exemplary language translator peripheral apparatus in accordance with the present invention, which is depicted in FIG. 2, may be obtained upon a cursory inspection of the appendices attached hereto, the detailed operating characteristics and mode of translation achieved by the exemplary language translator peripheral will be best understood in conjunction with the flow charts set forth in FIGS. 9A - 9C and these flow charts in turn are best considered after a review of the translation considerations presented in conjunction with the intervening figures as well as a consideration of the detailed content of the language translator ROMs 160 - 162. Accordingly, turning now to FIGS. 3A - 3L, various standard keyboards associated with twelve market countries with which the exemplary embodiment of the instant invention is disclosed, are illustrated to acquaint a reader with the variations imposed by the standard arrays used for exemplary, different language market versions. In particular, FIG. 3A illustrates a standard keyboard configuration employed within the U.S.A. and this keyboard configuration it should be noted provided the initial design considerations for the basic design of the system. Therefore, as shall become more apparent as this disclosure proceeds, many of the language translations initiated by the instant invention affect what is tantamount to a translation of a position code to a corresponding U.S. character code even though such character code may reside at a different key at the keyboard configuration illustrated in FIG. 3A. Additionally, it should be noted that the standard keyboard array dipicted in FIG. 3A is a 44 key array while the remaining keyboards illustrated in FIGS. 3B - 3L are 46 key arrays. Therefore, the two keys which are not employed in market versions of the instant invention directed to the requirements of the U.S. are effectively masked off. The remaining keyboards illustrated in FIGS. 3B - 3L comply with the requirements of the countries or language divisions used therein set forth in the annotation associated therewith and it will be appreciated that market versions of the instant invention devoted to the requirements of one of the individual countries listed in FIGS. 3B - 3L will have keyboards whose key caps present the standard array indicated in FIGS. 3B - 3L to an operator. It should additionally be noted, as indicated by the annotation provided in FIG. 3C, that key position 46 is juxtaposed in each of the standard keyboard arrays illustrated in FIGS. 3B - 3L to the position indicated by the arrow rather than appearing in the position indicated in each of FIGS. 3B - 3L. A perusal of FIGS. 3A - 3L will readily indicate to a reader that there are wide variations among the standard arrays illustrated with regard to the appearance of certain alphameric characters and such variations should be considered from two aspects. Thus, certain characters do not appear on all of the standard keyboard arrays and hence while no keyboard illustrated in FIGS. 3B - 3L includes more than 46 keys or 92 individual characters, the total number of different alphameric characters presented among all the standard arrays illustrated in 128. Furthermore, while certain characters are common to all the standard arrays illustrated, the key position at which they appear may vary widely among the countries.

Turning to FIG. 4, there is illustrated a keyboard face plate which may be employed within the automatic writing system employing the language translator peripheral according to the instant invention regardless of the market country to which the automatic writing system is devoted. The upper portion of FIG. 4 includes the standard array while the various control, action and related additional function keys are disposed below the standard array for ease of presentation even though, as indicated by the arrows AA such keys would be normally disposed at either side of the standard array in the manner indicated. A perusal of the standard array portion of FIG. 4 will readily reveal that only the keys enclosed within the heavy lined block 205 have alphameric character annotations regarding the letter print function associated therewith described thereon. This depiction is employed because as will be seen upon a review of FIGS. 3A - 3L, only these keys have alphameric characters associated therewith whose position in all of the standard arrays is fixed as to both appearance and the key upon which they appear while all of the remaining keys have variable letter or other alphameric character assignments associated therewith depending on the language market version to which the automatic writing system is devoted. Therefore, for the standard portion of the keyboard array illustrated in FIG. 4, all keys outside of those enclosed within the heavy lined block 205 would be provided with specialized key caps to correspond with those illustrated for a selected market as illustrated in FIGS. 3A - 3L. The keys on the keyboard illustrated in FIG. 4, it should be noticed, each bears a numeral in the upper left hand corner thereof corresponding to the key number thereof and three pairs of digits down the right hand side. The three pairs of digits down the right hand side, as indicated by the legend, represent the eight bit code, in hex, generated upon the depression of the key wherein the top hex code represents the mere depression of the key, the middle hex code represents a depression of the key in conjunction with the shift key and the lower hex code represents the code generated when the code key (L9)is in a down condition when the key is struck. The printed material at the bottom of certain keys such as keys 1, 4, 8, 12 and 16 in the top row of the standard array define legends provided with the key cap to indicate the encoded function associated with that key when the same is struck with the code key depressed. It should be noted that these encoded functions have been assigned on a constant position/character basis so as not to vary among the countries; however, this fact causes a certain variation between the various market language versions and those provided on U.S. embodiments. Therefore, as shall be seen hereinafter, one portion of the conversions performed by the language translator peripheral in translating keyboard position codes to media compatible or system codes is to translate the position codes associated with the encoded function, i.e. for instance, code DBB for PRT. FMT to those codes which result from a U.S. market keyboard for which the automatic writing system was initially designed. Additionally, it should be noted that the standard array is provided with a language, annotated LANG, encoded function associated with the R key. This encoded function is initiated the operator any time it is desired to change language mode from that of the native country to another country within the available set. Subsequent to the entry of the language encoded function, a two-digit number is entered by the operator to define the selected alternative language version and, in addition thereto, the operator would replace the daisy wheel print element at the printer unit to that which corresponds to the selected country. A list of the native language market designators together with the countries associated therewith is set forth at the top portion of FIG. 4, and it will be appreciated by those or ordinary skill in the art that a given version of the automatic writing system employing the instant invention will be automatically set up to operate in the native langauge version to which it is devoted and to which its keyboard corresponds while entry into another language mode must be initiated at the keyboard under operator control.

While FIG. 4 plainly illustrates that only a relatively few characters within each standard array are in a common position on all keyboards when viewed both from the standpoint of the presence of the character and the key position assigned thereto, certain characteristics of the keyboards employed as standards among the various countries permit convenient groupings to reduce necessary ROM memory requirements to achieve translation. These characteristics and the mode of grouping may best be appreciated in conjunction with the chart set forth in FIGS. 5 - 7. Thus, initially referring to FIG. 5, there is illustrated a chart relied upon to depict the nature of the alphameric variations at the media-compatible code level for the exemplary keyboards illustrated in FIGS. 3A - 3L. In FIG. 5, the hex media code associated with the row and column position in which such character appears wherein the column designation defines the most significant four bits of the code while the row position defines the least significant four bits thereof. Furthermore, the chart illustrated in FIG. 5 serves to show the manner in which various alphameric characters used by the keyboards may be classified. More particularly, the alphameric characters located in undivided cells within the chart, and which are unshaded, represent alphameric characters which appear on the same key in all of the exemplary standard keyboards illustrated in FIGS. 3A - 3L and hence those characters associated with the keys enclosed within the heavy block 205 in FIG. 4. As these characters appear on the same key position in each of the exemplary standard arrays set forth in FIGS. 3A - 3L, the character codes associated therewith are intelligible to the microprocessor and hence are never converted.

The alphameric characters enclosed within the shaded cells are characters which appear in all of the standard keyboard arrays shown in FIGS. 3A - 3L; however, the key positions to which these characters are assigned vary substantially among the standard arrays illustrated. Therefore, depending upon the market version in which keyboard position information associated with one of the characters appearing in a shaded block is entered, such position code may or may not require translation to a media code, which in this case will correspond to a U.S. code, for appropriate processing by the microprocessor. It should additionally be noted that regardless of the key position and the market version from which character information associated with one of the shaded blocks is entered, the translation, if it occurs, will cause the code to be shifted to a single code associated with that character for all the countries. The character symbols within the twelve individual squares of each divided cell in FIG. 5 represents characters which do not necessarily appear in all standard arrays and are not assigned to common keys within the arrays in which they appear. The key defining language market significance for the various divided cells is set forth in the lower right hand portion of FIG. 5. It will be appreciated by those or ordinary skill in the art that all alphameric codes except those appearing in unshaded whole cells in FIG. 5 may require translation from position keyboard codes to media codes depending upon the key to which they are assigned in a given market versions and hence grouping of such codes among certain market versions according to similarities would reduce ROM requirements necessary for translation providing initial grouping could occur in one translation derive suitable intermediate codes followed by a later translation of certain of the group of codes into media or system codes acceptable to the microprocessor.

Referring now to FIGS. 6A - 6D, there are shown various groupings of alphameric characters which are recognized as taking advantage of certain similarities which exist among certain countries and such groupings have been employed within the instant invention to reduce ROM requirements. More particularly, FIGS. 6A - 6D list all of the non-common keyboard position codes shown in FIG. 5 in a tabular form in such manner that the key number on the keyboard illustrated in FIG. 4 is listed along the left hand column (note key number 0 corresponds to key number 46), and next to the key code column is the key position code associated therewith. This is followed by the actual alphameric code associated with this key on a per country basis where the keys, codes, and countries are tabulated along the columns while the key numbers are listed on a row basis. It should additionally be noted that two rows are associated with each key number wherein the upper row associated with each key defines the code and alphameric character input into the system when the key is depressed in association with the shift key while the lower row represents the code and associated alphameric input when the key is depressed in a non-shifted condition. If the groupings of character information listed with associated key position information in FIGS. 6A - 6D are considered, it will be seen that many similarities in the alphameric character information assigned to a given key exists between the French, Belgium and Italian standard keyboards as well as the germanic types such as the German, Swiss-French and Swiss-German standard keyboards while corresponding similarities exist for the remaining standard keyboards. These similarities are taken advantage of to reduce translation ROM requirements in that positional codes obtained from French, Belgium and Italian standard keyboards are grouped together prior to further translation as are those associated with germanic types such as German, Swiss-French and Swiss-German. Once such grouping has been accomplished, final translation to actual media codes from the intermediate codes obtained through the grouping operation is implemented if the same is necessary. However, as shall be seen below, in many cases, no further translation is necessary since once initial grouping of common types have been accomplished, an acceptable media code frequently results.

Referring now to FIG. 7, there is shown a chart illustrating the variation in placement of encoded functions employed on the international keyboard configuration depicted in FIG. 4 and the resulting variation in positional codes between those obtained from the international keyboard and those employed in the U.S. market version which are intelligible to the microprocessor within the automatic writing system. Furthermore, the chart in FIG. 7 illustrates the manner in which positional information representing function codes, which vary with those obtained in the U.S. market version, are shifted by the translating apparatus according to the instant invention so as to correspond to the U.S. function codes which are intelligible to the microprocessor. More particularly, the chart illustrated in FIG. 7 is made up of a plurality of columns and rows wherein the column designations provided represent the four high order bits of the resulting code in hex while the row designations provided along the ordinant represent the four low order bits in hex. A review of the information written within the resultant chart depicted in FIG. 7 will reveal that certain blocks illustrated therein contain an upper and lower designation. Furthermore, the upper designation is delineated by a solid line and the abbreviation therein or key number together with the word code represents the code obtained from U.S. market versions of the automatic writing system which code is intelligible to the microprocessor. Conversely, the lower term which is delineated by a dashed line is representative of the code obtained from that encoded function on the international versions of the automatic writing system according to the instant invention. For instance, if the block located at hex address 12 is inspected, it will be seen that the abbreviation FLF standing for the first line find encoded function is present in the top portion of the block and is delineated by a solid line while the abbreviation LSP standing for the line space encoded function is present in the lower portion of the block and delineated by a dashed line. Accordingly, this representation is intended to indicatte that when the first line find encoded function is generated at a U.S. market version of the automatic writing system, the code 12 is inputted into the system while in international market versions a striking of the same key which results in the same positional hex code is an indication that the operator is coding the line space encoded function. The arrows intermediate the blocks in FIG. 7 are intended to illustrate the manner in which the language translator peripheral according to the instant invention achieves code conversions for the requisite encoded functions in the various market versions so that appropriate codes therefor which are intelligible to the microprocessor which was designed to accept the U.S. code versions therefor are produced. More particularly, if the block present at location 14 is inspected it will be seen that the lower abbreviation therein is FLF standing for the first line find encoded function and it is delineated by a dashed line to indicate that this positional code results when an operator codes this function from an international keyboard. The arrow 210 between the blocks at column locations 14 and 12 show that a conversion of the FLF or first line find encoded function is implemented by the language translator peripheral according to the instant invention in the manner indicated so that when a positional code 14 representing this encoded function is input in international versions of the machine, it is translated to the code 12 which stands for this encoded function in U.S. versions of the automatic writing system which code is intelligible to the microprocessor. The remaining arrows illustrated in FIG. 7 show additional translations of this type from positional codes entered at the international keyboard representing encoded functions to corresponding U.S. codes and it will be appreciated from a review of the portions of this disclosure which follow that (16) positional codes representing function codes are at variance with those obtained in the U.S. versions of the automatic writing system and hence (16) translations of this nature must be provided.

Referring now to FIGS. 8A – 8N, there are shown code charts setting forth the actual code contents of the data ROMs employed within the instant invention. In actuality, only FIGS. 8A – 8M are code charts illustrating the contents of the language translator ROMs 160 – 162, as shown in FIG. 2, while the code chart depicted in FIG. 8N represents exemplary contents for the printer data ROM 43 shown in FIG. 1, however, the same is provided herein to enhance reader appreciation in regard to the instant invention. The various code charts setting forth the contents of the various ROMs employed within the instant invention and that for the printer data ROM 43 are provided herein to illustrate an exemplary coding sequence for the implementation of the instant invention and are employed in conjunction with the description of the flow charts illustrated in FIGS. 9A – 9C to precisely indicate the nature of each translation which occurs. At this juncture in the specification, however, it is sufficient merely to provide a brief, generalized description setting forth the nature of the content of each of the code charts illustrated in FIGS. 8A – 8N to provide a reader with an acquaintance therewith. The code chart illustrated in FIG. 8A is referred to in latter portions of this specification as chart 3.6-1 and corresponds to the contents of the language translator ROM 161 illustrated in FIG. 2. As aforesaid, one-half of the storage of the language translator ROM 161 is devoted to the keyboard input translating function while the other half of this ROM is devoted to the provision of variable spoke printer data for cases where printer data may not be obtained through direct addressing of the printer data ROM. The portion of FIG. 8A whose stored content is associated with the translation of keyboard input position codes into media or system codes is present in columns 0 – 7, rows O - F while the portion thereof devoted to variable spoke printer data resides in columns 8 - F, rows O - F. The content of the language translator ROM 161 is uniform regardless of market version and hence need not be modified for specific language versions of the automatic writing system. It may also be noted that the portion of this chart present in columns 8 - F, row 0, defines hammer force and ribbon width for the variable spoke printer data while the remaining portion of this half of the ROM, i.e., columns 8 - F, rows 1 - F have the seven least significant bits therein devoted to variable spoke printer data per se which defines character information.

The charts illustrated in FIGS. 8B – 8L define the contents of the keyboard input translator ROM 160 which, it will be recalled, differs for each language market version for which the automatic writing system is provided. These charts are referred to in the flow charts set forth in FIGS. 9A – 9C as charts 3.6-2 while each of FIGS. 8B – 8L bear this numeral together with a decimal indication corresponding to the native language market version with which the same is associated where such numerical designation is a decimal representation of the reference codes set forth in the upper portion of FIG. 4. In addition, each of FIGS. 8B – 8L are provided with appropriate annotation in the upper left hand corner thereof to plainly indicate the native language version with which they are associated. It should be appreciated by those of ordinary skill in the art that only a single one of the various code charts displayed in FIGS. 8B – 8L will be employed for a given market version and hence if a particular market version is devoted to U.K. English, the keyboard input translator ROM 160 would be programmed in accordance with the contents specified in FIG. 8B while a market version of the automatic writing system devoted to French requirements would have keyboard input translator ROM 160 programmed in accordance with the contents of the chart illustrated in FIG. 8D. However, as all that is involved is the replacement of two memory chips and any appropriate key caps to obtain a new market version, it will be appreciated by those of ordinary skill in the art that the instant invention effectively acts to adapt the automatic writing system disclosed in U.S. Patent application, Ser. No. 622,780, supra, to the requirements of a particular country with only a minimal amount of modification which is substantially less than that required for the provision of a new keyboard. FIG. 8M corresponds to the content of the media to printer data ROM 162 and the contents of this ROM are also uniform regardless of market version and hence only a single chart, which in this case is annotated 3.6-3 is provided therefor. FIG. 8N is a chart corresponding to the content of the printer data ROM 43 and supplied in the automatic writing system employed in conjunction with the instant invention and is provided so that the reader may peruse the same to ascertain the nature of the character information provided thereby. Essentially, spoke information for all characters is provided except for cases where similar characters appear on different spokes of print wheels devoted to the requirements of different native language markets.

The operation of the instant invention as well as the detailed nature of the various translations which take place in accordance with the teachings thereof are best appreciated in conjunction with the flow charts depicted in FIGS. 9A – 9C. The flow chart illustrated in FIG. 9A is directed to the steps of translation which occur, in accordance with the teachings of the present invention associated with the translation of keyboard entry codes into media compatible or system codes associated with the native language to which a given market version of the automatic writing system is devoted. FIG. 9B is a flow chart which displays tests conducted and additional translation steps performed to ascertain whether or not a given language market version of the automatic writing system is being operated in its native language or in another language mode as well as illustrating the steps of translation which take place to obtain acceptable system or media codes for the language in which operation is occurring. Finally, FIG. 9C is a flow chart which illustrates the manner in which the translation of media codes to addresses for the printer data ROM or for addressing the variable spoke printer data portion of ROM 161 occurs to obtain suitable data for the printer unit.

Turning now to the flow chart depicted in FIG. 9A, it will be seen that the program routine illustrated therein is entered upon the loading of a keyboard entry into the main register M and subsequent to certain classification and identification operations which may be performed thereon by the microprocessor to exclude certain codes. Thereafter, the first test performed under program control, as indicated by the diamond 215, is to ascertain whether or not the language translator peripheral according to the instant invention is present in the machine. This step is present because as will be appreciated by those of ordinary skill in the art, the language translator peripheral according to the instant invention basically is an add-on to the automatic writing system disclosed in U.S. Patent application Ser. No. 622,780, supra, and thus employs the same program detailed therein without modification. Accordingly, the first step of this program is to thus acertain whether or not the automatic writing system under consideration is equipped with the language translator peripheral. The test indicated by the diamond 215 may be readily achieved through a branch operation on the status bus and a wiring of a suitable input to one of the plurality of multiplexer device within the automatic writing system to a level suitable to indicate whether or not the language translator peripheral is present. When this condition is gated onto the common status bus, the presence of the level will cause a branching operation while in the absence thereof, a negative indication as to the presence of the language translator peripheral is provided. If the test indiated by the diamond 215 is negative, processing, as indicated by the triangle 216, continues as if a standard automatic writing system for domestic U.S. purposes, as was disclosed in U.S. application Ser. No. 622,780, supra, is present and hence, reentry into the flow chart indicated in FIG. 9B to cause normal printing occurs in the manner indicated. However, if the test conducted under program control is affirmative, as indicated by the arrow 217 annotated Yes, an international version of the machine is present and hence, comparisons and translations of keyboard entry data necessary for the conversion of keyboard input position data to media codes is necessary. Therefore, as indicated by the rectangle 218 the code entered from the keyboard is compared with the contents of FIG. 8A or Table 3.6-1 and more particularly the 32 locations therein defined by columns 0 - 7 and rows 0 - 3. This is accomplished, under program control, by addressing appropriate rows and columns within the language translator peripheral ROM 161 shown in FIG. 2 and reading the contents of each address storage location into the main register M for subsequent comparison by the arithmetic logic unit 84 with the code originally entered from the keyboard. A recollection of FIG. 2 will render it apparent that the addressing techniques for the language translator ROMs 160 - 162 enables sequential comparisons of the type required by this step in the program to be easily accomplished by setting the row address within the latch 164 followed by the initial column address in latch 165. Thereafter, the column addresses for that row is merely incremented for each comparison until all eight column comparisons have been achieved. The comparison operations indicated by the rectangle 218 will be seen to cause a comparison of the keyboard entry code with each of the 32 codes stored in the upper left hand section of FIG. 8A. The comparisons indicated by the rectangle 218 constitute the initial step of the three step conversion sequence appropriate for the translation of keyboard codes to media codes and the comparisons indicated thereby are continued until all 32 storage locations have been compared or a location has been found therein which compares identically with the keyboard code which was entered. This is indicated by the daimond 219 in FIG. 9A.

If a comparison has been located, as indicated by the arrow 220 annotated Yes, the initial translation indicated by the rectangle 221 is implemented; however, as indicated by arrow 222 annotated No, if all 32 storage locations have been compared without an affirmative result, the initial translation steps indicated by the rectangle 221 may be by-passed or skipped. The initial translating steps indicated by the recangle 221 function to modify, where appropriate, selected keyboard entry codes in accordance with the native language to which the automatic writing system is devoted and hence to groove such codes in groups of three so that advantages of resulting codes having the similarities pointed out in FIGS. 6A-6D may be taken advantage of to reduce ROM storage requirements.

An appreciation of the translation steps indicated by the rectangle 221 may best be obtained by reference to the code chart of FIG. 8A in conjunction with the explanation therefor provided herein. Thus, as plainly indicated within the rectangle 221, when a comparison occurs, the column address for the location in which the comparison was obtained is maintained while the row address is incremented by the high order four bit code in location FD of Table 3.6-2. Tables 3.6-2 as illustrated in FIGS. 8B - 8L are unique to the language market version to which a given machine is devoted and the information stored in storage location FD therein serves to identify the native language of an instant machine to the automatic processor for this translation which acts, as aforesaid, to groove and translate input keyboard codes according to the similarities exhibited among certain language key formats. More particularly, as also indicated within the rectangle 221, if the native language in French, Belgium or Italian, the row address is incremented by four and a review of the contents of storage location FD in FIGS. 8D, 8E and 8F will readily reveal that the high order hex bit specified therein which is used for the purposes of incrementing the row location is a four. Similarly, if the market language version is German, Swiss-French or Swiss-German, the row address is incremented by eight and reference to the contents of storage location FD with FIGS. 8C, 8G or 8H will confirm that the high order bit of information indicated as present therein is an eight. For any of the remaining countries, no actual translation to an operating code is to occur and hence the row address for the location in which the comparison was obtained is incremented by Zero and hence, reference to storage location FD in any of the code charts devoted to these language formats will reveal that the high order bit is a Zero. For instance, referring to FIG. 8A if it is assumed that the code 25, as appears in location 40, has been found to compare identically with a keyboard entry, the conversion indicated by rectangle 221 would cause the row address of this location to be incremented by four if the native language were French, Belgium or Italian and hence the new location 44 which contains the code 35 in hex would be accessed to produce an operating code. Similarly, if the same comparison occurred and the native language version was devoted to German, Swiss-French, or Swiss-German, the row address would be incremented by eight and thus yield the new code 26 which occurs at storage location 48. However, should this comparison obtain in a U.K.-English, Swedish or any of the remaining codes, the code originally found to compare at location 40 would have its row address incremented by Zero so that retranslation to an operating code would effect conversion to the original code initially supplied from the keyboard. Accordingly, it will be appreciated by those of ordinary skill in the art that the translation step indicated by the rectangle 221 effectively serves to groove keyboard codes entered from native language keyboards such as French, Beligum, Italian, German, Swiss-French or Swiss-German into new operating code formats while other codes entered from the keyboard are left in tact even if a comparison therefor is obtained.

Upon the completion of the translation operations indicated by the rectangle 221, a second stage translating operation indicated by the rectangle 223 is initiated and, as plainly indicated by the flow chart depicted in FIG. 9A, the traslation steps indicated by rectangle 223 are implemented regardless of whether or not a comparison of the entered code in the manner indicated by the diamond 219 was obtained.

The translation steps indicated by the rectangle 233 serve to translate the (16) encoded function codes discussed in conjunction with FIG. 7 into codes representing their U.S. counterparts. This conversion, is effected, in the manner indicated by the rectangle 223 by individually comparing the (16) codes present in columns 0 - 7, rows C and D of FIG. 8A with the position keyboard information entered into the system. The comparison operation indicated by the rectangle 223, as indicated by the diamond 224 is continued until all (16) storage locations have been compared with the entered code or a comparison located has been obtained. This is indicated by the diamond 224. If a comparison is obtained, the translation indicated by the rectangle 225 is initiated; however, if no comparison is obtained after all (16) storage locations have been accessed, as indicated by the arrow 226 annotated No, the second step of the three step translation procedure indicated in FIG. 9 is skipped. The translation step indicated by the arrow 225 effectively maps the location of the column which compares in row C and D into a corresponding column location in rows E and F by freezing the column location in which the comparison was obtained and incrementing the row address thereof by two. For example, if a 11 code was entered at the keyboard indicating a word underscore encoded function, a comparison would result at storage location 1C. Therefore, as indicated by the rectangle 225, the row address of the 1C storage location is incremented by 2 to yield a new address 1E which contains a new code 14 corresponding to the U.S. counterpart for this encoded function. Reference to FIG. 7, storage locations 11 and 14 will readily depict the nature of the translation which is achieved for function codes by the step indicated by the rectangle 225. The translation steps performed by rectangles 221 and 225 are essentially independent as keyboard position codes representing alphameric characters are treated by the rectangle 221 while keyboard position codes representing mutually exclusive encloded functions are treated by the rectangle 225. Therefore, it will be appreciated by those of ordinary skill in the art that the order in which these steps of operation are performed are mutually exclusive and hence are optional to the designer of the system.

At the completion of the second translation step indicated by the rectangle 225, the third comparison operation associated with the third step of translation is initiated and as will be appreciated by those of ordinary skill in the art, this third step of translation acts to cause intermediate operating codes to be translated as a function of the native language to which the automatic writing system is devoted into a media recordable code appropriate for operation within that language. More particularly, as indicated by the rectangle 227, the resulting code now obtained is compared with the contents of table 3.6-2, columns 0 - E, rows C and D or the 30 storage locations within an appropriate one of the charts illustrated in FIGS. 8B - 8L so that a compatible media code for the specific language under consideration is obtained. The comparison indicated by the rectangle 227, as indicated by the diamond 228 is continued until all 30 storage locations have been compared or an affirmative comparison has been obtained. When an affirmative comparison has been obtained as indicated by the arrow 229 annotated Yes, the translation step to obtain a native language media code as indicated by the rectangle 230 is implemented. However, if no comparison is obtained upon a comparison of the 30 storage locations, which may occur in the manner outlined above, the translation operation indicated by the rectangle 230 may be skipped in the manner indicated by the arrow 231, annotated No, to thus complete the requisite steps of processing to a native language code as set forth in FIG. 9A.

The translation operation indicated by the rectangle 230 operates on the code chart associated with the native language, as illustrated in FIGS. 8B - 8L, to map a compared location from rows C and D, columns 0 - E into a corresponding column location in rows E and F by the addition of 2 to the row address in which the comparison occurred. As each of the charts illustrated in FIGS. 8B - 8L are associated with a particular country, it will be appreciated that a code associated with the particular language to which the automatic writing system is assigned will result. For instance, it was seen in conjunction with the discussion of rectangles 218 and 221 that a code 25 entered at the keyboard is retained as a code 25 for the U.K. system, translated to a code 35 for a French, Belgium or Italian system and translated to a code 26 for a German, Swiss/French or Swiss/German system. Thereore, if FIG. 8B is inspected, it will be appreciated that the comparison steps indicated by rectangle 227 will achieve a comparison for a code 25 at location 4C and hence this code will be translated through the step indicated by rectangle 230 into row E which translates code 25 into a code 23 which represents a pound sign in media code for a U.K. version of the automatic writing system. Similarly, the 35 code which results from the translation step indicated by rectangle 22 for a French system would not be further translated because as indicated in FIG. 8D, no comparison would obtain therefor in row C and D columns 0 - E. However, if a 1A had been entered at the keyboard of a French system, no translation would occur since no comparison therefor would obtain through the action indicated by rectangle 218; however, a comparison would result in rows C and D of FIG. 8D and the 1A code located at location 1C would be translated into a 19 code at row E. This 19 code has no meaning to the system within a French system even though the 1A code initially entered is indicative of a precedented hyphen in media code. This translation to a meaningless media code, as here occurred, is appropriate to indicate error since a predetermined hyphen code would be properly entered as indicated by location 0C as a 19 code which would then be translated to the 1A code through the translation step indicated by the rectangle 230. In like manner, entry of a code 25 in the German system would be translated to a code 26 by the translation step indicated by rectangle 221 and hence no comparison would result due to comparisons run in accordance with the dictates indicated by block 227. However, if a code 21 were entered from the keyboard in a German system, the method steps indicated by blocks 218 and 221 would retain this code in a 21 format and thereafter, the translation step indicated by block 230 would cause the comparison obtained at location 2C to cause translation to the 3B code in location 2E which is representative of a semi-colon.

Accordingly, through the three distinct translating functions set forth within FIG. 9A, a native language code intelligible to the microprocessor when the automatic writing system is operating in a native mode is obtained. However, prior to the further processing of this code, as if the same comprised a media code, the status of the system must be checked to ascertain whether or not the same is operating in its native language format or the operator has shifted print operations to an alternate mode. Such alternate mode may be enabled by the operator, in the manner described in conjunction with FIG. 4 by the actuation of the code key and the language encoded function key together with an insertion of the appropriate digit pair to indicate the desired language to the system. Once the native language code has been obtained in the manner indicated by the flow chart present in FIG. 9A, the action of translation, shifts under program control to the flow chart present in FIG. 9B to perform alternate language tests.

The flow chart indicated in FIG. 9B performs appropriate tests to ascertain whether the language code obtained through the operation of FIG. 9A must be further translated in accordance with the language mode in which the automatic writing system in operating to obtain an appropriate media recordable or system code and when such translation is required, it is performed to obtain the requisite media recordable code. More particularly, as indicated by the rectangle 232, the native language code obtained as a result of the comparisons indicated in FIG. 9A is compared with all of the storage locations in the native language row of the appropriate native language table 3.6-2 shown in FIGS. 8B - 8L. The native language row for a given system is obtained, as indicated by the rectangle 232 by decrementing the low order hex code in the location FD of that table, i.e., the table programmed into the keyboard input translator ROM 164 of that machine to thus obtain the native language row. For instance, if the U.K. English 3.6-2 chart illustrated in FIG. 8B is inspected, it will be seen that a 01 code is present in storage location FD and hence decrementing the low order hex code by one results in a Zero (0) which defines row 0 of that charge which corresponds to the U.K. - English code chart present therein. Similarly, in a German system, as indicated in FIG. 8C, storage location FD has a 2 in the low order bit position thereof and decrementing this code by one results in a One designation which corresponds to the row annotated GE for German in FIG. 8C. Once the row is obtained in the manner indicated by the rectangle 232, each of the codes in all of the columns O-F thereof are compared with the code developed through the processing operations indicated by the flow chart of FIG. 9A. This is continued as indicated by the diamond 233 until all of the (16) codes therein have been exhausted or a comparison results. If no comparison is obtained, as indicated by the arrow 234 annotated No, no further translation is required regardless of whether or not the system is operating in an alternate language mode. However if a comparison occurs, as indicated by the arrow 235 annotated Yes, translation to a media code associated with a selective language may be required in the manner indicated by the rectangle 236. When the automatic writing system employing the instant invention is initialized, the native language to which the automatic writing system is assigned is loaded into storage locations GB3 - 0 within the general purpose registers 83 during a power up operation and should the operator desire to change the mode of operation through the exercise of the use of the language option encoded function, the appropriate hex input as listed adjacent to the flow chart in FIG. 9B is loaded as a four bit code into general storage locations GB3 - 0 to define the selected language. It may be noted that only the low order bits for the list of language options are employed. Thus, storage locations GB3-GB0 in the general purpose registers 83 will contain a language designator defining the language in which the system is presently defined to operate. This language designator, as indicated by the rectangle 236 is read from the general purpose registers, decremented by one and employed to define a new row for the code which was found to compare during the operation indicated by the rectangle 233. Thus, if the automatic writing system is operating in its native language, no change in the row designator occurs and hence no translation of the native language code developed at the output of the flow chart in FIG. 9A results. However, if the native language is not the same as that in which the automatic writing system is presently operating, a translation to an appropriate code for the selective operating language may be required. For example, reference to FIG. 8B will reveal that in a U.K.-English market version of the automatic writing system, the production of a code 2A subsequent to the operations depicted in flow chart 9A will result a comparison at location 30. If the machine is operating in its native language, no translation in the code will occur due to the processing step indicated by the rectangle 236. However, should the automatic writing system have been programmed by an operator to operatin in French, Belgium, Italian, Swedish, Dutch or Spanish translation to the appropriate code will occur. For instance, if the system were operating in French, the designator code stored would be 3; thus decrementing the language designator code by one in the manner indicated by the rectangle 236 would result in an incrementing of the row address of 0 by two to yield storage location 32 in which the hex code 5B resides as illustrated in FIG. 8B. Thus, a code for a * code in U.K.-English has been translated to a code for a degree (°) in French to achieve appropriate translation of the native language code to a media code appropriate for the selective language. Once the translation steps indicated by the rectangle 236 have been completed, all translations directed to obtaining a media code are at an end as indicated by the circle 237. Thus, as indicated by the rectangle 238, recordable media codes for a selective language which are intelligible to the system have been obtained. These codes may then be processed in the normal manner by the microprocessor and additionally loaded within the read/write buffer 35 for possible recording. Thereafter, it must be ascertained whether or not a printing character has been presented so that appropriate print operations may be initiated.

Accordingly, as indicated by the diamond 239, the system or media recordable codes now present in the main register M for processing are tested to ascertain whether or not a printing character code is present. If no printing character code is present, appropriate action as indicated by the rectangle 240 is taken so that the character code is appropriately further processed and employed by the system to set the operating conditions associated therewith. However, if a printing character code is present, as indicated by the arrow 241 annotated Yes, the status bus must again be tested in the manner indicated by the diamond 242 and explained in conjunction with the diamond 215 in FIG. 9A to ascertain whether or not the language card is present. If the language card is not present, translation of the media code for appropriate addressing of the printer data ROM is not required and hence normal processing for printer functions may occur in the manner indicated by the arrow 243 annotated No. However, if the language card is loaded, as indicated by the arrow 244 annotated Yes, translation to obtain an appropriate address for addressing the printer data ROM or alternatively the variable spoke printer data contained within the translator ROM 161 may be required. The manner in which these functions are implemented are set forth in conjunction with the flow chart depicted in FIG. 9C.

The flow chart depicted in FIG. 9C principally concerned with the translation of media codes from a machine having a language card loaded therein into an appropriate address for addressing either the printer data ROM 43 as shown in FIG. 1 or the variable spoke printer data contained in the language translator ROM 161 shown in FIG. 2. The flow chart illustrated in FIG. 9C is entered at the location indicated by the inverted triangle numbered 3. Upon entry of this flow chart, the media code to be treated is initially compared, as indicated by the rectangle 245 with the codes contained in row 0, column O - F of table 3.6-3 which is shown in FIG. 8M and corresponds to the information of the media to printer data ROM 162. This comparision of the media code with the (16) locations present in row 0 of FIG. 8M defines (16) media codes which must be appropriately modified to obtain addresses for either the printer data ROM 43 or for the language translator ROM 161. However, if none of these codes are present the media code may be employed directly to address the printer data ROM in the manner normally implemented within the automatic writing system defined in U.S. Pat. application Ser. No. 622,780, supra. Thus, as indicated by the diamond 246, and the arrow 247 annotated No, where all (16) storage locations within row 0 of Table 3.6-3 are tested and no comparison is found, the printer data ROM may be entered directly, in the manner indicated by the rectangle 248, to obtain (12) bits of printer character information defining the spoke address, the ribbon or character width, and the hammer force employed for the printing of that character. However, if an affirmative comparison results, as indicated by arrow 249 annotated Yes, translation of that code may be required in the manner indicated by the rectangle 250.

The translation indicated by the rectangle 250 initiates a mapping of the storage location for which the compared code was found into a row defined in FIG. 8M by the language designator code maintained in the general purpose registers and described in conjunction with the translation associated with rectangle 236 in FIG. 9B. Since the language designator code maintained in the general purpose registers 83 may define the native language as well as a selective alternate language mode, it will be seen that once a compared location is found within the Zero row of FIG. 8M, mapping will take place for that location regardless of the language mode presently operative within the automatic writing system even though the code which is translated in response to the operation defined by the rectangle 250 may not change due to such translation. For instance, if a comparison of the media code presented results in a compare indication in row 0 at the column 7 position, it will be seen that a 5B media code was presented. Therefore, assuming a U.K.-English native language is the native language for which the automatic writing system is dedicated, and the operator has not selected an alternate language mode through the use of the language encoded function, a 1 hex code will be the language designator. Thus, the storage location defined by the 70 coordinates will be mapped into storage location 71 where a 5B code resides and as a result of the translation indicated by the rectangle 250, the code 5B which is an address for the printer data ROM will be produced. However, if it is again assumed that a comparison operation was obtained in column 7 for row 0, of the chart illustrated in FIG. 8M for a U.K.-English native language but it is further assumed that a French alternate language has been encoded by the operator, it will be appreciated that the language designator established therefor within the general purpose registers is a 3. Under these circumstances, the storage location 70 would be mapped into storage location 73 whereupon an 8E code representing the address for a period would result. Similarly, with the same assumptions except considering that the operator has elected a Swiss-French language option, translation within column 7 would move down to row 6 so that the 5B code would again be read out even though an alternate language to the native language occurred. The resulting codes read from the translation indicated by the rectangle 250 are effectively addresses, as shall be seen below, which are employed either for use directly with the printer data ROM or after suitable modification for application to the portion of the language translator ROM 161 which contains variable spoke printer data. A perusal of the codes listed in the chart illustrated in FIG. 8M will reveal that certain locations have a solid square printed in the upper left hand corner thereof which is associated with the code 5F while the remaining storage locations in the rows associated with countries contain the appropriate alphameric character associated with the address code therefor. The code 5F stands for an underscored space which is employed within the instant invention to indicate an error to the operator in that she has selected an improper language mode for the character information for which printing was desired. Thus, the underscored space code which results, is here utilized as an error flag.

upon the completion of the translation indicated by the rectangle 250, the resulting address read is tested, in the manner indicated by the diamond 251, to ascertain whether or not such address code is greater than code 7F. If the result is negative, as indicated by the arrow 252 annotated No, the address obtained upon the step of translation indicated by the rectangle 250 may be employed in a direct manner to address the printer data ROM in the manner indicated by the rectangle 248 in the same way that the system achieves processing in U.S. versions or for a code for which no comparision was obtained as explained above. Additionally, as indicated by the triangle 253, U.S. only printing functions which occur, as will be seen in FIG. 9B when the language card is absent, enter the print routine at this point. The contents of the printer data ROM are illustrated in FIG. 8N to provide familiarity to the reader as to what codes and print functions may be appropriately processed thereby in the manner indicated in U.S. Patent application Ser. No. 622,780.

If however, the code obtained from the translation step indicated by the rectangle 250 exceeds a value 7F, as indicated by the arrow 254 annotated Yes, variable spoke printer data must be obtained from the half of the language translator ROM 161 containing such information in the manner indicated by the rectangle 255. A review of FIG. 8M will reveal that address codes exceeding a value of 7F are normally associated with specialized alphameric characters whose presence is not consistent among all the language options selected and where the same are present their appearance tends to vary from key to key. This may be quickly appreciated by scanning down column 6B, and C in FIG. 8M. For similar reasons, the position of such alphameric characters is not constant in spoke position for daisy wheel print elements for the various selectable language options and hence specialized spoke positions, hammer force and ribbon displacement must be developed therefor on a per country basis. The variable spoke printer information maintained in one-half of the language translator ROM 161 is illustrated in columns 3 - F of the chart shown in FIG. 8A which is a uniform code chart employed for all the countries. Thus, as indicated by the rectangle 255, the chart illustrated in FIG. 8A is entered into in two passes to obtain five bits representing hammer force and ribbon displacement while a second pass develops seven bits of information representing the absolute address of the printer spoke for that character as the same appears on a daisy wheel print element devoted to that country. The chart of FIG. 8A is entered, as indicated in the rectangle 255, by obtaining the relevant column by masking off the high order hex bit of the address code developed through the translation step indicated by the rectangle 250 and employing the low order hex bit which remains as a column designator. Thereafter, the code which appears in row 0 of that column gives the hammer force and character width as a five bit group wherein the least significant bits are employed and constant values are present in each column while that column together with the row defined by the language designator stored within the general purpose register yields a second eight bit hex code, the least significant seven bits thereof which are employed to define the spoke on a daisy wheel print element suitable for the language requirements selected for the relevant character being addressed. More particularly, let it be assumed that the translation step indicated by the rectangle 250 yielded the code 8E for a machine operating in the Belgiam language mode which appears at location 94 of FIG. 8M and represents a period. Following the steps for entering the variable spoke printer data ROM indicated by the rectangle 255, the high order hex bit would be masked off to leave the code E and this code would be employed as a column designation for the chart illustrated in FIG. 8A. Then hammer force and ribbon displacement would be obtained by addressing row 0 of that column location which would yield the code 0B and the five least significant bits thereof, as appropriately ordered by the microprocessor, would yield a two bit code indicating a hammer force of 2 and a 3 bit code indicating a ribbon displacement of five units. Thereafter, the E column designation would be retained and the language designator, which in this case, is four would be employed to provide a new row indication within that column which would cause the eight bit code 7B to be accessed and the least significant seven bits thereof would define spoke position 91 in the manner indicated in FIG. 8A. This information would be read from the language translator ROM 161 in two passes, reordered in an appropriate manner by the microprocessor indicated by the dashed block 16 in FIG. 1 and forwarded in two eight bit passes to the printer unit 2 so that 12 bits of print information specifying spoke position, hammer force and ribbon displacement would be provided thereto whereupon the printer unit could implement the printing of this character.

Accordingly, it will be appreciated by those of ordinary skill in the art that the useage of the instant invention in conjunction with the program steps detailed in FIG. 9C results in the translation of media codes to address codes which may be employed to either address the printer data ROM or the portion of the language translator 161 containing variable spoke printer information so that unique printer codes may be accessed therefrom. These printer codes may then be forwarded to the printer unit 2 so that twelve bits of print information specifying spoke position of a desired character, hammer impact level and ribbon displacement are provided thereto to cause the print function to be initiated assuming an appropriate daisy wheel print element has been loaded thereon.

Therefore, it will be appreciated by those of ordinary skill in the art that the instant invention enables the word processing equipments developed for a specific country or language version to be adopted to universal requirements while enhancing the capabilities thereof in such a manner that an operator may optionally select an alternate language mode for which the system is to operate in and achieve appropriate printing therefor. This is done by initially treating the keyboard input information as keyboard position codes and thereafter translating such position codes into system or media compatible codes which the processing equipment can analyze, inspect and operate upon. Thereafter for printing purposes, the system compatible media code is further translated, if necessary, so that the same may be employed as an address for the printer data ROM normally present within the automatic writing system and if no provision for a specialized alphameric code is available within the normally utilized printer data ROM, variable spoke language information is maintained within the instant invention to provide a full measure of printer information for such specialized alphameric characters. Furthermore, the translation of keyboard position information to media compatible codes occurs through three basic translating operations wherein the initial translating operation acts to groove such codes into intermediate codes displaying a basic similarity among the language options, the second translation acts to translate encoded function codes to system codes with which the microprocessor can deal while the third conversion of the translation acts to further translate many codes for which additional processing is necessary into actual system codes. Although the instant invention has been set forth in accordance with twelve selected language options and accordingly suitable coding schemes were provided in the various charts therefor, it will be seen that any suitble language options may be provided and compatible codes the refor selected in accordance with the teachings disclosed herein. In addition, various changes, modifications and adaptations to the grooving, translating and coding schemes employed herein may be made without modifying the basic concepts employed within the instant invention. Accordingly, while many modifications may be made to the exemplary embodiment of the instant invention disclosed, many of such modifications and adaptations will be obvious to those of ordinary skill upon a perusal of the instant disclosure and hence this invention is not deemed to be limited thereto.

To enhance the disclosure set forth herein the following Appendices have been attached hereto to further acquaint the reader with specific details of the instant invention as well as the environment in which the same is operative. These Appendices are entitled and enumerated as folllows:

| | |
|---|---|
| Appendix A | Operand List |
| Appendix B | Storage Locations Within General Purpose Registers G and H |
| Appendix C | Tables Illustrating Converted Key/Character Significance From Language Market Version to Alternative Language Modes |
| Appendix D | Character Font Arrangements |
| Appendix E | Key Station Descriptor Index |

While the invention has been described in connection with a preferred embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. In an automatic word processing system including a keyboard, a printer and processor means for carrying out word processing functions indicated at the keyboard, each of which is connected to a common data bus and a common instruction word bus carrying instructions from said computer, improved apparatus for translating character information comprising:
   keyboard position information entered on said data bus at said keyboard, and
   language translation means for translating said keyboard position information as a function of a selected one of a plurality of language formats into media codes acceptable to said processor means, said language translation means being connected to said common data bus and said common instruction word bus and further including:
   a plurality of read-only memory storage means addressable for providing said media codes,
   means operatively connected to said common data bus and said plurality of read-only memory storage means for addressing said read-only memory storage means, along said common data bus, enabling means operatively connected to said common data bus and said common instruction word bus, for reading various read only memories for operation as a function of computer instructions present on said common instruction word bus and said data bus, output gating means for gating information read from said read only memories to said common data bus, said output gating means being operatively connected to said common data bus and said common instruction word bus and controlled by instructions on said common instruction bus, printer data memory for supplying printer codes for operation of said printer in one of a plurality of language formats, said printer data memory being operatively connected to said common data bus for receiving data from said gating means and said common instruction word bus, and further means within said language translation means for addressing certain read only memories for translating certain specific media codes.

2. The improvement according to claim 1 further including means within said language translator means for providing printer codes to said printer for those printer codes not provided in said printer data memory.

3. The improvement according to claim 1 wherein said keyboard position information corresponds to entry positions for character information to said processor means.

4. The improvement according to claim 1 wherein said keyboard position information corresponds to entry positions for encoded functions to said processor means.

5. IN an automatic word processing system, a method of translating information entered from a keyboard in any of a plurality of language formats comprising the steps of:
   entering character information from a keyboard as keyboard position information regardless of which one of a plurality of language formats has been selected,
   applying said position information to a common data bus for transmittal to a first red only storage means,
   comparing in a comparison means, in sequence, the position information with predetermined portions of the contents of the first read only memory to produce media codes,
   comparing in the comparison means, in sequence, the said media codes with other predetermined portions of the contents of the first read only memory,
   addressing a second read only memory storage means with the media codes to provide print data when the last comparison results in a media code whose address is less than a predetermined value,
   addressing the first read only memory with the media codes to provide print data when the last comparison results in a media code whose address is greater than a predetermined value, applying the print data to a printer unit causing operation of the unit in a selected one of said plurality of language formats.

* * * * *